United States Patent
Lee

(10) Patent No.: US 12,361,571 B2
(45) Date of Patent: Jul. 15, 2025

(54) METHOD AND APPARATUS WITH CONVOLUTION NEURAL NETWORK PROCESSING USING SHARED OPERAND

(71) Applicant: Samsung Electronics Co., Ltd., Suwon-si (KR)

(72) Inventor: Sehwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/663,438

(22) Filed: May 14, 2024

(65) Prior Publication Data

US 2024/0303837 A1    Sep. 12, 2024

Related U.S. Application Data

(63) Continuation of application No. 16/564,215, filed on Sep. 9, 2019, now Pat. No. 12,014,505.

(30) Foreign Application Priority Data

Apr. 2, 2019  (KR) .................. 10-2019-0038606

(51) Int. Cl.
*G06N 3/04* (2023.01)
*G06N 3/063* (2023.01)
(Continued)

(52) U.S. Cl.
CPC .............. *G06T 7/33* (2017.01); *G06N 3/04* (2013.01); *G06N 3/063* (2013.01); *G06N 3/08* (2013.01);
(Continued)

(58) Field of Classification Search
None
See application file for complete search history.

(56) References Cited

U.S. PATENT DOCUMENTS

| 10,572,225 B1 | 2/2020 | Ghasemi et al. |
| 10,936,891 B2 | 3/2021 | Kim et al. |

(Continued)

FOREIGN PATENT DOCUMENTS

| CN | 108090565 A | 5/2018 |
| CN | 108205519 A | 6/2018 |

(Continued)

OTHER PUBLICATIONS

Korean Office Action issued on May 17, 2024, in counterpart Korean Patent Application No. 10-2019-0038606 (5 pages in English, 7 pages in Korean).

(Continued)

*Primary Examiner* — Tyler W. Sullivan
(74) *Attorney, Agent, or Firm* — NSIP Law

(57) ABSTRACT

A neural network apparatus including one or more processors including a controller configured to determine a shared operand to be shared in parallelized operations as being either one of a pixel value among pixel values of an input feature map and a weight value among weight values of a kernel, based on either one or both of a feature of the input feature map and a feature of the kernel, and one or more processing units configured to perform the parallelized operations based on the determined shared operand.

11 Claims, 14 Drawing Sheets

Related U.S. Application Data

(60) Provisional application No. 62/799,190, filed on Jan. 31, 2019.

(51) Int. Cl.
  *G06N 3/08* (2023.01)
  *G06T 1/20* (2006.01)
  *G06T 7/33* (2017.01)

(52) U.S. Cl.
  CPC ...... *G06T 1/20* (2013.01); *G06T 2207/20081* (2013.01); *G06T 2207/20084* (2013.01); *G06T 2210/52* (2013.01)

(56) References Cited

U.S. PATENT DOCUMENTS

| | | |
|---|---|---|
| 11,200,092 B2 | 12/2021 | Zhang et al. |
| 11,507,817 B2 | 11/2022 | Abdelaziz et al. |
| 12,014,505 B2 * | 6/2024 | Lee .................. G06N 3/08 |
| 2016/0358069 A1 | 12/2016 | Brothers et al. |
| 2017/0024632 A1 | 1/2017 | Johnson et al. |
| 2018/0089562 A1 | 3/2018 | Jin et al. |
| 2018/0129893 A1 | 5/2018 | Son et al. |
| 2018/0181829 A1 | 6/2018 | Morozov et al. |
| 2018/0181865 A1 | 6/2018 | Adachi |
| 2018/0189643 A1 | 7/2018 | Kim et al. |
| 2018/0253636 A1 | 9/2018 | Lee et al. |
| 2018/0267898 A1 | 9/2018 | Henry et al. |
| 2019/0042923 A1 | 2/2019 | Janedula et al. |
| 2019/0180499 A1 | 6/2019 | Caulfield et al. |
| 2019/0311252 A1 | 10/2019 | Chen et al. |
| 2019/0340510 A1 | 11/2019 | Li et al. |
| 2020/0151019 A1 | 5/2020 | Yu et al. |
| 2020/0210175 A1 | 7/2020 | Alexander et al. |
| 2021/0004701 A1 | 1/2021 | Shibata |
| 2021/0011970 A1 | 1/2021 | Han |
| 2021/0192248 A1 | 6/2021 | Kim et al. |
| 2021/0365791 A1 | 11/2021 | Mishali |
| 2022/0269950 A1 | 8/2022 | Lee |

FOREIGN PATENT DOCUMENTS

| | | |
|---|---|---|
| CN | 108268931 A | 7/2018 |
| KR | 10-2018-0101978 A | 9/2018 |
| WO | WO 2018/107476 A1 | 6/2018 |

OTHER PUBLICATIONS

Kim, D. et al., "ZeNA: Zero-Aware Neural Network Accelerator", *IEEE Design & Test*, Feb. 2, 2018, pp. 39-46 (8 pages in English).

Sombatsiri, Salita, et al. "Parallelism-flexible Convolution Core for Sparse Convolutional Neural Networks on FPGA." *IPSJ Transactions on System LSI Design Methodology* 12, 2019, (6 pages in English).

Extended European Search Report issued on Jun. 25, 2020 in counterpart European Patent Application No. 20152834.6 (10 pages in English).

Japanese Office Action issued on Feb. 27, 2024, in counterpart Japanese Patent Application No. 2020-015497 (6 pages in English, 6 pages in Japanese).

Chinese Office Action issued on Dec. 3, 2024 in corresponding Chinese Patent Application No. 201911321489.1. (7 pages in English and 8 pages in Chinese).

Wang Can, "Binary Acceleration Based on Hashing", DOI: 10.16589/j.cnki.cn11-3571/tn.2018.20.017 (1 Page in English, 3 Pages in Chinese).

Chinese Office Action Issued on Apr. 16, 2025, in Counterpart Chinese Patent Application No. 201911321489.1 (5 Pages in English, 5 Pages in Chinese).

* cited by examiner

METHOD AND APPARATUS WITH CONVOLUTION NEURAL NETWORK PROCESSING USING SHARED OPERAND

CROSS-REFERENCE TO RELATED APPLICATIONS

This application is a continuation of U.S. patent application Ser. No. 16/564,215 filed on Sep. 9, 2019 which claims the benefit of U.S. Provisional Patent Application No. 62/799,190, filed on Jan. 31, 2019, in the U.S. Patent and Trademark Office, and the benefit of Korean Patent Application No. 10-2019-0038606, filed on Apr. 2, 2019, in the Korean Intellectual Property Office, the disclosures of which are incorporated herein in their entirety by reference.

BACKGROUND

1. Field

The present disclosure relates to a methods and apparatuses with convolution neural network processing.

2. Description of the Related Art

A neural network refers to a computational architecture. Certain electronic systems may analyze input data and extract effective information by using a neural network device.

Neural network devices may perform a huge amount of operations with respect to input data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general embodiment, a neural network apparatus includes: one or more processors comprising: a controller configured to determine a shared operand to be shared in parallelized operations as being either one of a pixel value among pixel values of an input feature map and a weight value among weight values of a kernel, based on either one or both of a feature of the input feature map and a feature of the kernel; and one or more processing units configured to perform the parallelized operations based on the determined shared operand.

The one or more processing units may be configured to perform the parallelized operations between the pixel value of the input feature map and weight values of the kernel, in parallel, in response to the controller determining the shared operand to be the pixel value of the input feature map.

The controller may be configured to determine the shared operand to be a first pixel value and determine another shared operand to be a second pixel value of the input feature map, and the one or more processing units may include: one or more first processing units configured to perform the parallelized operations between the first pixel value of the input feature map and weight values of the kernel, in parallel; and one or more second processing units configured to perform the parallelized operations between the second pixel value of the input feature map and the weight values of the kernel, in parallel.

The one or more processing units may be configured to perform the parallelized operations between the weight value of the kernel and the pixel values of the input feature map, in parallel, in response to the controller determining the shared operand to be the weight value of the kernel.

The controller may be configured to determine the shared operand to be a first weight value and determine another shared operand to be a second weight value of the kernel, and the one or more processing units may include: one or more first processing units configured to perform the parallelized operations between the first weight value of the kernel and pixel values of the input feature map, in parallel; and one or more second processing units configured to perform the parallelized operations between the second weight value of the kernel and the pixel values of the input feature map, in parallel.

The shared operand, the pixel value of the input feature map, and the weight value of the kernel may be of a first layer of a neural network, and the controller may be further configured to determine, for a second layer of the neural network, a shared operand of the second layer to be either one of a pixel value of an input feature map of the second layer and a weight value of a kernel of the second layer, based on either one or both of a feature of the input feature map of the second layer and a feature of the kernel of the second layer.

The feature of the input feature map may include either one or both of a percentage of pixels having a zero value within the input feature map and a shape of the input feature map, and the feature of the kernel may include a percentage of weights having a zero value within the kernel.

The controller may be configured to determine the shared operand to be the weight value of the kernel in response to a percentage of the weights of the kernel having a zero value is greater than a set value.

A number of the one or more processing units that commonly share the shared operand may be equal to either one of a number of pixels of an input channel of the input feature map and a number of output channels of the kernel.

The one or more processors may be configured to perform a three-dimensional (3D) convolution operation between the input feature map having a 3D size and the kernel having a four-dimensional (4D) size.

The one or more processing units may be configured to skip parallelized operations among the parallelized operations in response the shared operand being zero.

In response to the controller determining the shared operand to be the pixel value of the input feature map, the one or more processing units may be configured to: skip parallelized operations, among the parallelized operations, between a first pixel value among the pixel values of the input feature map and first weight values among the weight values of the kernel, in response to the first pixel value being zero, and perform parallelized operations, among the parallelized operations, between a second pixel value among the pixel values of the input feature map and second weight values among the weight values of the kernel.

In response to the controller determining the shared operand to be the weight value of the kernel, the one or more processing units may be configured to: skip parallelized operations, among the parallelized operations, between a first weight value among the weight values of the kernel and first pixel values among the pixel values of the input feature map, in response to the first weight value being zero, and perform parallelized operations, among the parallelized operations, between a second weight value among the weight values of the kernel and second pixel values among the pixel values of the input feature map.

The apparatus may further include a memory storing instructions that, when executed by the one or more processors, configure the one or more processors to perform the obtaining of the kernel bit-serial block, the generating of the feature map bit-serial block, and the generating of at least the portion of the output feature map.

In another general aspect, a processor-implemented neural network method includes: determining a shared operand to be shared in parallelized operations as being either one of a pixel value among pixel values of an input feature map and a weight value among weight values of a kernel, based on either one or both of a feature of the input feature map and a feature of the kernel; and performing the parallelized operations based on the determined shared operand.

The determining may include determining the shared operand to be the pixel value of the input feature map, and the performing may include performing the parallelized operations between the pixel value of the input feature map and weight values of the kernel, in parallel.

The determining may include determining the shared operand to be the weight value of the kernel, and the performing may include performing the parallelized operations between the weight value of the kernel and pixel values of the input feature map, in parallel.

The performing may include skipping parallelized operations among the parallelized operations in response to the shared operand being zero.

The determining may include determining the shared operand to be the pixel value of the input feature map, and the performing comprises skipping parallelized operations, among the parallelized operations, between a first pixel value among the pixel values of the input feature map and first weight values among the weight values of the kernel, in response to the first pixel value being zero, and performing parallelized operations, among the parallelized operations, between a second pixel value among the pixel values of the input feature map and second weight values among the weight values of the kernel.

The determining may include determining the shared operand to be the weight value of the kernel, and the performing may include skipping parallelized operations, among the parallelized operations, between a first weight value among the weight values of the kernel and first pixel values among the pixel values of the input feature map, when the first weight value is zero, and performing parallelized operations, among the parallelized operations, between a second weight value among the weight values of the kernel and second pixel values among the pixel values of the input feature map.

A non-transitory computer-readable storage medium may store instructions that, when executed by one or more processors, cause the one or more processors to perform the method.

In another general aspect, a processor-implemented neural network method includes: obtaining an input feature map and a kernel; determining a shared operand as being either one of a pixel value among pixel values of the input feature map and a weight value among weight values of the kernel; and determining pixel values of an output feature map by performing operations between the shared operand and either one of each of the weight values of the kernel and each pixel value.

The pixel values of the input feature map may correspond to a first channel among channels of the input feature map, the weight values correspond to a first channel among channels of the kernel, and each of the pixel values of the output feature may correspond to a same position of a respective channel among channels of the output feature map.

The determining of the shared operand may include: determining the shared operand as being the pixel value of the input feature map in response to a two-dimensional area size of the input feature map being less than or equal to a set value; and determining the shared operand as being the weight value of the kernel in response to a two-dimensional area size of the input feature map greater than or equal to another set value.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
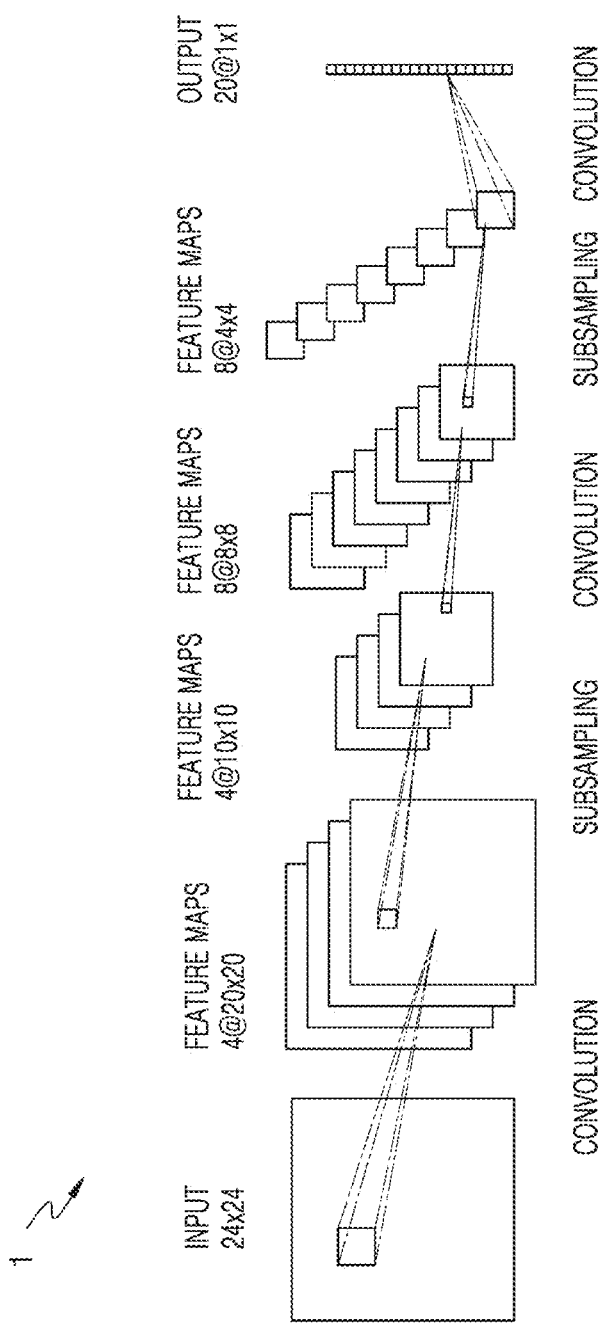
FIG. 1 illustrates an architecture of a neural network according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

In the description of the embodiments, when a part is connected to another part, it includes not only a case where the part is directly connected but also a case where the part is electrically connected with another part in between. Also, when a part includes a constituent element, it means that the embodiment may include other elements other than the exclusion of other elements unless specifically stated otherwise.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Reference will now be made in detail to embodiments, examples of which are illustrated in the accompanying drawings, wherein like reference numerals refer to the like elements throughout. In this regard, one or more embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The below embodiments relate to methods and apparatuses with convolution neural network processing.

FIG. 1 illustrates an architecture of a neural network according to one or more embodiments.

Referring to FIG. 1, a neural network 1 may be architecture of a deep neural network (DNN) or an n-layer neural network. The DNN or n-layer neural network may correspond to a convolutional neural network (CNN), a recurrent neural network (RNN), a deep belief network, or a restricted Boltzmann machine. For example, the neural network 1 may be embodied as a CNN, but is not limited thereto. In FIG. 1, some convolution layers of a CNN corresponding to an example of the neural network 1 are illustrated, but the CNN may further include, in addition to the illustrated convolution layers, a pooling layer or a fully connected layer.

Thus, as illustrated, the neural network 1 may be embodied as an architecture having a plurality of layers including an input image layer, feature map generating layers, and an output layer. In the neural network 1, a convolution operation may be performed on the input image with a filter referred to as a kernel, and as a result, the feature maps (or activation maps or convolved features) may be output. The convolution operation is performed again on the output feature maps as input feature maps, with a kernel, and new feature maps are output. When the convolution operation is repeatedly performed as such, a recognition result with respect to features of the input image may be finally output through the neural network 1.

For example, when an input image having a 24×24 pixel size is input to the neural network 1 of FIG. 1, the input image may be output as feature maps of four channels each having a 20×20 pixel size, through a convolution operation with a kernel. The sizes of the 20×20 feature maps may be reduced through the repeated convolution operations with the kernel, and finally, features each having a 1×1 pixel size may be output. In the neural network 1, a convolution operation and a sub-sampling (or pooling) operation may be repeatedly performed in several layers so as to filter and output robust features, which may represent the entire input image, from the input image, and derive the recognition result of the input image through output final features. Based on the above, it is understood that example embodiments discussed herein include embodiments with one or more, in various combinations, or all such layers, stages, edges, etc. in operations of the neural network 1.

Figure 2A:
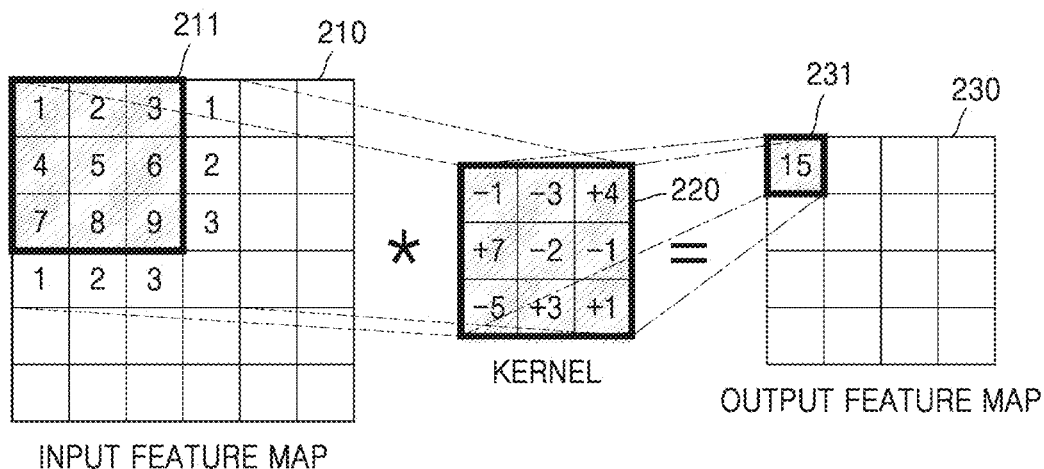
FIGS. 2A and 2B illustrate convolution operations in a neural network.
Figure 2A:
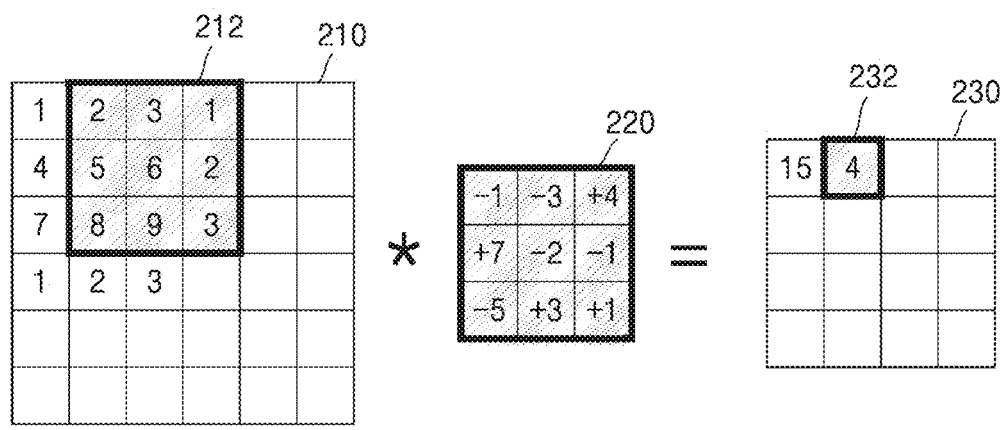
Figure 2A:
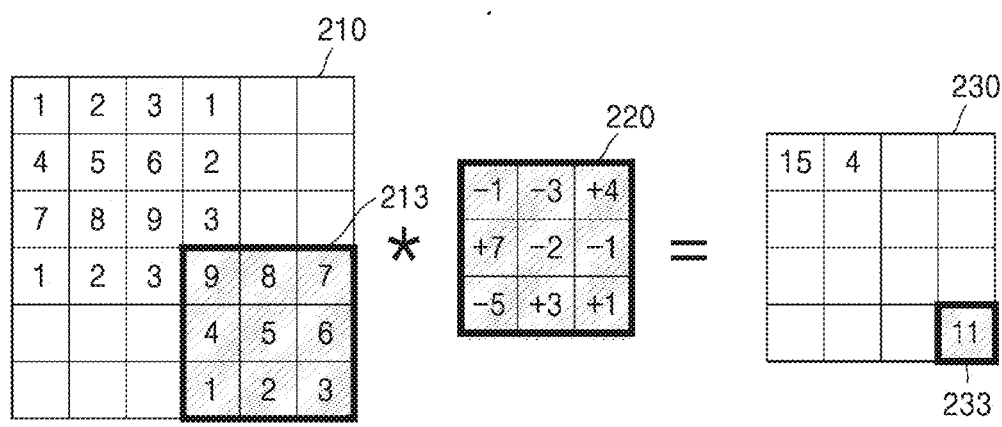
Figure 2B:
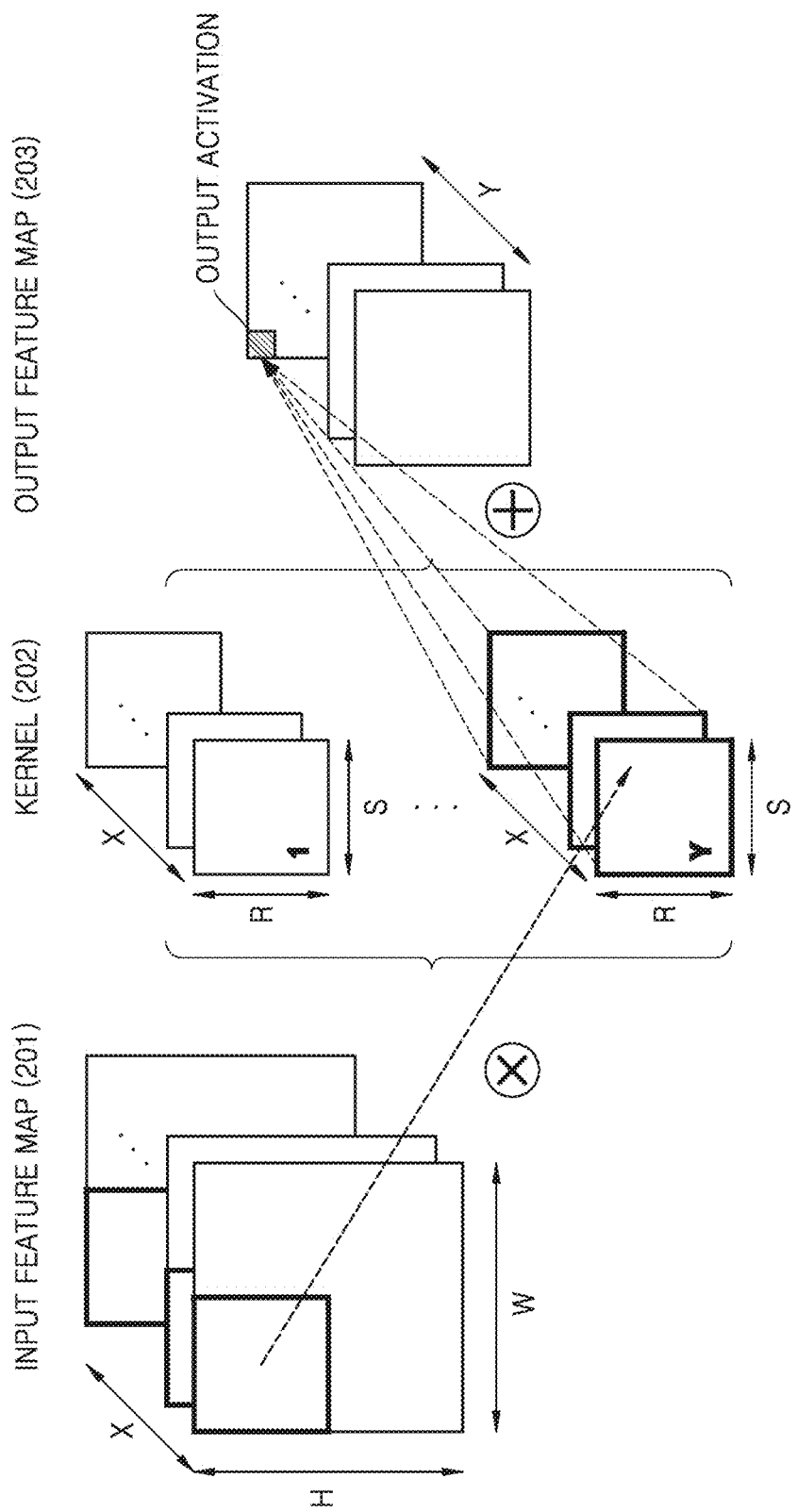

FIGS. 2A and 2B illustrate convolution operations in a neural network.

In one or more embodiments, an input feature map 210 may have a 6×6 pixel size, a kernel 220 may have a 3×3 pixel size, and an output feature map 230 may have a 4×4 pixel size, as shown in the example of FIG. 2A, but sizes are not limited thereto, and the neural network may include feature maps and kernels having various sizes. Values defined in the input feature map 210, the kernel 220, and the output feature map 230 are all merely example values, and embodiments are not limited thereto. Each pixel of the input feature map may include a pixel value.

The kernel 220 may perform a convolution operation while sliding on the input feature map 210 in a region (or tile) unit having a 3×3 pixel size. The convolution operation may include an operation in which each pixel value of the output feature map 230 is obtained by adding values obtained by multiplying each pixel value of any region of the input feature map 210 by a weight of each element at a corresponding location in the kernel 220. For example, the kernel 220 first performs a convolution operation with a first region 211 of the input feature map 210. For example, pixels values of 1, 2, 3, 4, 5, 6, 7, 8, and 9 of the first region 211 may be multiplied by weights of −1, −3, +4, +7, −2, −1, −5, +3, and +1 of elements of the kernel 220, respectively, and, as a result, values of −1, −6, 12, 28, −10, −6, −35, 24, and 9 may be obtained. Next, the obtained values of 1, −6, 12, 28, −10, −6, −35, 24, and 9 may be added up to obtain a value of 15, and a pixel value 231 on the first row and the first column of the output feature map 230 may be determined to be the value of 15. The pixel value 231 on the first row and the first column of the output feature map 230 corresponds to the first region 211. Similarly, a convolution operation may be performed between a second region 212 of the input feature map 210 and the kernel 220, and thus a pixel value 232 of the first row and the second column of the output feature map 230 may be determined to be 4. The convolution operation may be respectively performed between first through sixteenth regions of the input feature map and the kernel 220 such that pixel values for each position of the output feature map 230 are determined. For example, a convolution operation may be performed between a sixteenth region 213 (e.g., a last window of the input feature map 210, and the kernel 220), and thus a pixel value 233 of the fourth row and the fourth column of the output feature map 230 may be determined to be 11. That is, the convolution operation between the input feature map 210 and the kernel 220 may be performed by repeatedly processing multiplications of values of elements corresponding to each other in the input feature map 210 and the kernel 220 and the sum of multiplication results, and the output feature map 230 may be generated as a result of the convolution operations.

A two-dimensional (2D) convolution operation has been described with reference to FIG. 2A. However, in other examples, a three-dimensional (3D) convolution operation may be performed, wherein input feature maps, kernels, and output feature maps of a plurality of channels exist, an example of which will be described with reference to FIG. 2B.

Referring to FIG. 2B, an input feature map 201 may have a 3D size, there may be X input channels in the input feature map 201, and a 2D input feature map of each input channel may have a size of H rows and W columns, wherein X, W, and H are each a natural number. A kernel 202 may have a four-dimensional (4D) size, and 2D kernels each having a size of R rows and S columns may exist as many as X input channels and Y output channels, wherein R, S, and Y are each a natural number. For example, the number of channels of the kernel 202 may correspond to (e.g., may equal) the number X of input channels of the input feature maps 201 and the number Y of output channels of an output feature map 203, and a 2D kernel of each channel may have a size of R rows and S columns. The output feature map 203 may be generated via a 3D convolution operation between the input feature map 201 of a 3D size and the kernel 202 of a 4D size, and the output feature map 203 may have Y channels as a result of the 3D convolution operation.

A process of generating an output feature map via a convolution operation between one 2D input feature map and one 2D kernel may be as described above with reference to FIG. 2A, and the 2D convolution operation as described above with reference to FIG. 2A may be repeatedly performed between X input channels of the input feature maps 201 and Y output channels of the kernel 202 to generate the output feature map 203 of Y output channels. Based on the above, it is understood that example embodiments discussed herein may include embodiments with one or more, in various combinations, or all channels X in an input feature map and/or channels Y of an output feature map.

Figure 3:
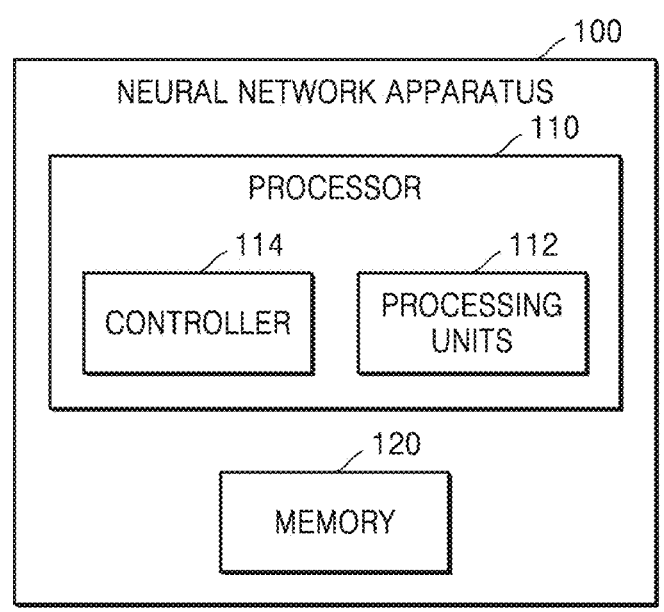
FIG. 3 illustrates a hardware structure of a neural network apparatus according to one or more embodiments.

FIG. 3 illustrates a hardware structure of a neural network apparatus according to one or more embodiments.

In one or more embodiments, a neural network apparatus 100 may be, and/or may be implemented as, any one of various types of devices, such as a personal computer (PC), a server, a mobile device, and an embedded device, and for example, may be or include a smartphone, a tablet device, an augmented reality (AR) device, an Internet of Things (IoT) device, an autonomous vehicle, a robot, or a medical device, which performs voice recognition, image recognition, and image classification using any one or any combination of the neural network layers and/or neural networks made up of one or more of the layers of nodal convolutional interactions discussed herein, but is not limited thereto. In another example, the neural network apparatus 100 may correspond to an exclusive hardware (HW) accelerator mounted on such a device, and may be an HW accelerator, such as a neural processing unit (NPU), a tensor processing unit (TPU), or a neural engine, which, as a non-limiting example, is an exclusive module for driving a neural network, but is not limited thereto.

Referring to FIG. 3, the neural network apparatus 100 may include a processor 110 and a memory 120. Components related with one or more embodiments from among the components of the neural network apparatus 100 are shown in FIG. 3. However, it will be understood to one of ordinary skill in the art after an understanding of the present disclosure that the neural network apparatus 100 may further include general-purpose components in addition to those shown in FIG. 3.

The processor 110 may control all functions for executing a neural network in the neural network apparatus 100. For example, the processor 110 may control all functions of the neural network apparatus 100 by executing instructions stored in the memory 120 in the neural network apparatus 100. The processor 110 may be implemented as a central processing unit (CPU), a graphics processing unit (GPU), an application processor (AP), etc., which are included in the neural network apparatus 100, but is not limited thereto.

The memory 120 is hardware for storing various pieces of data processed in the neural network apparatus 100. For example, the memory 120 may store data processed and to be processed in the neural network apparatus 100. Furthermore, the memory 120 may store applications, drivers, etc. to be driven by the neural network apparatus 100. The memory 120 may include random-access memory (RAM) (such as dynamic random-access memory (DRAM) or static random-access memory (SRAM)), read-only memory (ROM), electrically erasable programmable read-only memory (EEPROM), a CD-ROM, a Blu-ray disk, other optical disk storage, a hard disk drive (HDD), a solid state drive (SSD), or a flash memory, but is not limited thereto.

The processor 110 reads and/or writes neural network data, for example, image data, feature map data, or kernel data, from or to the memory 120, and executes a neural network by using the read/written neural network data. When the neural network is executed, the processor 110 may drive a processing unit for a convolution operation provided therein to repeatedly perform a convolution operation between an input feature map and a kernel, thereby generating data related to an output feature map. Here, an operation count of the convolution operation may be determined based on various factors, such as the number of channels of the input feature map, the number of channels of the kernel, the size of the input feature map, the size of the kernel, and the precision of a value.

The processor 110 may obtain an input feature map and a kernel and may perform a convolution operation between the input feature map and the kernel. The processor 110 may include hardware processing units 112 in order to perform a convolution operation. The processing units 112 may perform the convolution operation in parallel and may respectively include logic circuits for a convolution operation. In detail, each of the processing units 112 may include an operator including a combination of a multiplier, an adder, and an accumulator. The multiplier may be embodied as a combination of a plurality of sub-multipliers, and the adder may be embodied as a combination of a plurality of sub-adders.

The processor 110 may further include an on-chip memory that performs a cache function to perform a convolution operation, and a dispatcher that dispatches various operands, such as pixel values of an input feature map and weights of kernels. The dispatcher may dispatch, to the on-chip memory, operands, such as pixel values and weights required by the processing units 112 to perform an operation, from data of pixel values of input feature maps and weights of kernels, wherein the data is stored in the memory 120. The dispatcher may also dispatch the operands dispatched to the on-chip memory again to the processing units 112 for the convolution operation.

The processor 110 may include a controller 114 that determines an operand that the processing units 112 are to process. During a convolution operation between the input feature map and the kernel, the controller 114 may determine a shared operand that is to be shared in parallelized operations to be performed by the processing units 112, as one of the pixel value of an input feature map or the weight value of a kernel. According to an example, during a convolution operation between a first input feature map and a first kernel, the controller 114 may determine the shared operand to be the pixel value of the first input feature map. According to another example, during a convolution operation between a second input feature map and a second kernel, the controller 114 may determine the shared operand to be the weight value of the second kernel.

The controller 114 may determine the shared operand to be one of the pixel value of the input feature map or the weight value of the kernel, based on at least one of the feature of the input feature map or the feature of the kernel. In detail, the controller 114 may determine the shared operand to be one of the pixel value of the input feature map or the weight value of the kernel, based on at least one of the percentage of pixels having a zero value within the input feature map, the percentage of weights having a zero value within the kernel, or the shape of the input feature map. According to an example, when the percentage of pixels having a zero value within the input feature map is equal to or greater than a preset critical value, the controller 114 may determine the shared operand to be the pixel value of the input feature map. The controller 114 may determine the percentage of pixels having a zero value within an input feature map in a current layer, based on the percentage of pixels having a zero value within an input feature map in a previous layer. According to another example, when the percentage of weights having a zero value within the kernel is equal to or greater than a preset critical value, the controller 114 may determine the shared operand to be the weight value of the kernel. According to another example, when the number of input channels of the input feature map is large or the size of a two-dimensional (2D) input feature map is small, the controller 114 may determine the shared operand to be the pixel value of the input feature map.

The controller 114 may determine the shared operand to be one of the pixel value of the input feature map or the weight value of the kernel, for each layer of a neural network. For example, during a convolution operation between an input feature map of a first layer and a kernel of the first layer, the controller 114 may determine a shared operand of the first layer to be the pixel value of the input feature map of the first layer. During a convolution operation between an input feature map of a second layer and a kernel of the second layer, the controller 114 may determine a shared operand of the second layer to be the weight value of the kernel of the second layer. In other words, every time a layer is changed, the controller 114 may change the shared operand from the pixel value of the input feature map to the weight of the kernel or may change the shared operand from the weight of the kernel to the pixel value of the input feature map.

The processing units 112 may perform parallelized operations, based on the shared operand determined by the controller 114. For example, when the pixel value of the first input feature map is determined as the shared operand, the processing units 112 may commonly receive the pixel value of the first input feature map as one operand in an operand pair and may receive different weight values of the first kernel as the other operand. As another example, when the weight value of the first kernel is determined as the shared operand, the processing units 112 may commonly receive the weight value of the first kernel as one operand in an operand pair and may receive different pixel values of the first input feature map as the other operand. Because the processing units 112 commonly receive the shared operand and perform parallelized operations, the processing units 112 may implement a scalar-vector multiplication operation. The processing units 112 may output output values by performing the parallelized operations, and the output values may be accumulated in an output feature map.

Because the neural network apparatus 100 is able to control the processing units 112 to share the shared operand, the processing units 112 may be controlled equally, leading to simplification of a hardware structure and reduction in hardware costs. In addition, because the neural network apparatus 100 is able to determine the shared operand of the processing units 112 to be one of the pixel value of the input feature map or the weight value of the kernel, the shared operand may be selected to effectively use the parallelism of the convolution operation. According to an example, in order to more effectively implement zero skipping, the neural network apparatus 100 may determine the shared operand to be one of the pixel value of the input feature map or the weight value of the kernel. A detailed embodiment will be described below with reference to FIGS. 11 and 12. According to another example, the neural network apparatus 100 may select a shared operand to more effectively implement the parallelized operations of the processing units 112, according to the shape of the input feature map of one layer. A detailed embodiment will be described with reference to FIG. 6.

When the neural network apparatus 100 performs a three-dimensional (3D) convolution operation between an input feature map having a 3D size and a kernel having a 4D size, although the dimensions of the input feature map and the kernel are different from each other, the neural network apparatus 100 may determine one of the pixel value of the input feature map or the weight value of the kernel as the shared operand and thus may realize a hardware structure capable of performing parallelized operations.

Figure 4:
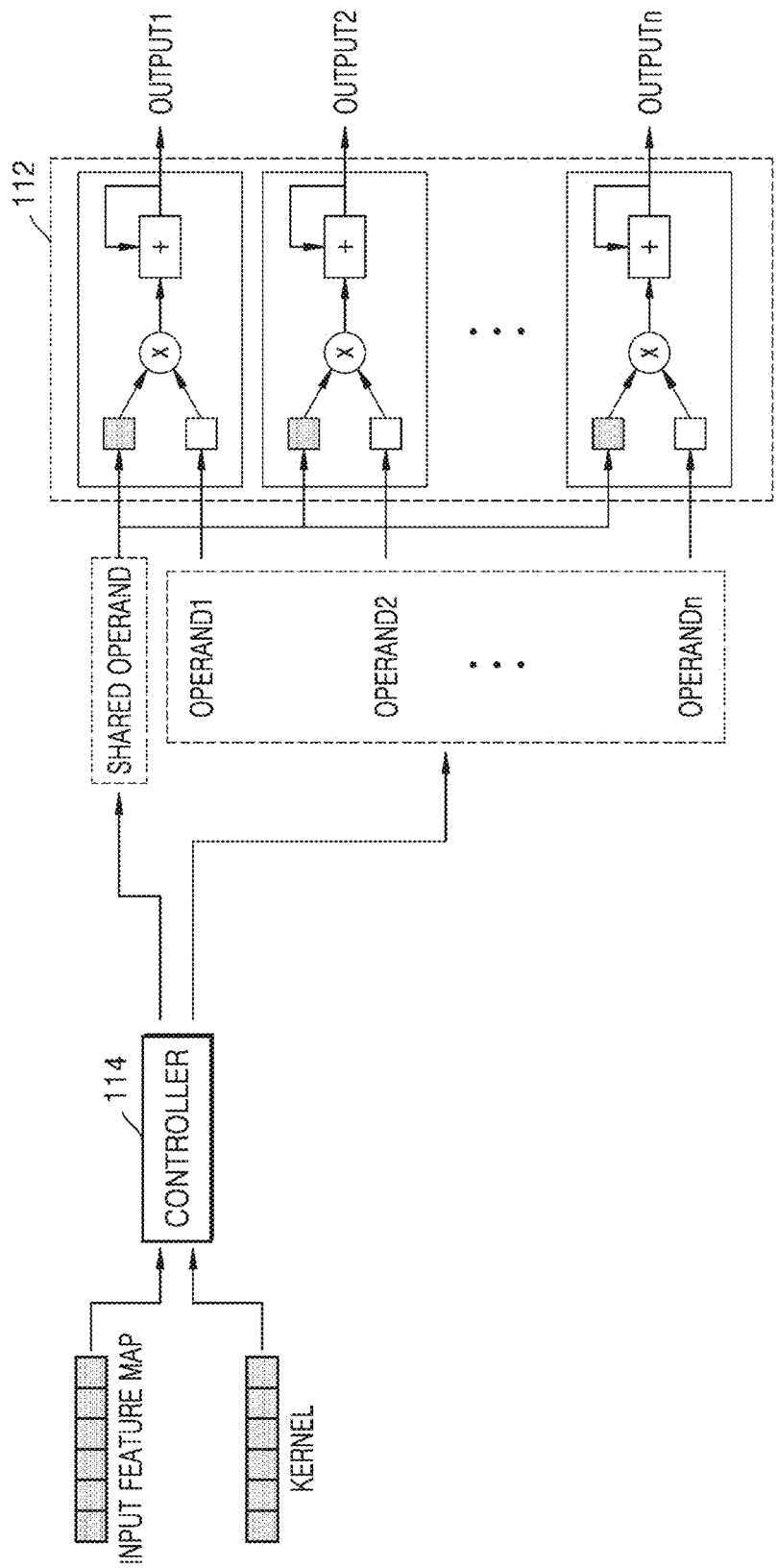
FIG. 4 illustrates a controller and hardware processing units included in a neural network apparatus according to one or more embodiments.

FIG. 4 illustrates a controller and hardware processing units included in a neural network apparatus according to one or more embodiments. In an example, the controller and processing units respectively correspond to the controller 114 and processing units 112 of FIG. 3. For convenience of explanation, examples will be discussed below using this example, noting that embodiments are not limited thereto.

As a non-limiting example, the controller 114 may obtain an input feature map and a kernel from the memory 120. That is, while operations of FIG. 4 will be explained with references to the neural network processing device 100, embodiments are not limited thereto. The controller 114 may determine one of the pixel values of the input feature map or one of the weight values of the kernel to be a shared operand that is to be shared by the processing units 112, based on at least one of the features of the input feature map and/or at least one of the features of the kernel.

The controller 114 may control the pixel value of the input feature map and the weight value of the kernel to be input to the processing units 112 and may control in particular a predetermined shared operand to be commonly input to the processing units 112. According to an example, when a pixel value of the input feature map is determined as the shared operand, the controller 114 may control the pixel value of the input feature map to be input to each of the processing units 112 and may control different weight values of the kernel to be input to different processing units 112, respectively. In other words, the controller 114 may control the different weight values of the kernel to be input as operands 1 through n, respectively, to the different processing units 112. According to another example, when the weight value of the kernel is determined as the shared operand, the controller 114 may control the weight value of the kernel to be input to each of the processing units 112 and may control different pixel values of the input feature map to be input to different processing units 112, respectively. In other words, the controller 114 may control the different pixel values of the input feature map to be input as operands 1 through n, respectively, to the different processing units 112. Under the control of the controller 114, the dispatcher of the processor 110 may dispatch an operand pair including the shared operand to each of the processing units 112. As shown in FIG. 4, hardware processing units 1 through n, of the processing units 112, may each respectively perform one or more operations on the shared operand and a respective operand 1 through n to generate a respective output 1 through n, while embodiments are not limited thereto.

Because each of the processing units 112 may be any one or any combination of any two or more of a hardware multiplier, adder, and accumulator, each of the processing units 112 may output output values (output 1 through n) via multiplication and/or addition operations with respect to the input operand pair, and the output values (output 1 through n) may be accumulated into the output feature map. Also, because each of the processing units 112 may perform operations between a shared operand and a different operand (e.g., a respective operand), the processing units 112 may implement an 1×n hardware architecture that implements a scalar (shared operand)-vector (operand 1, operand 2, through to operand n) multiplication operation.

Figure 5A:
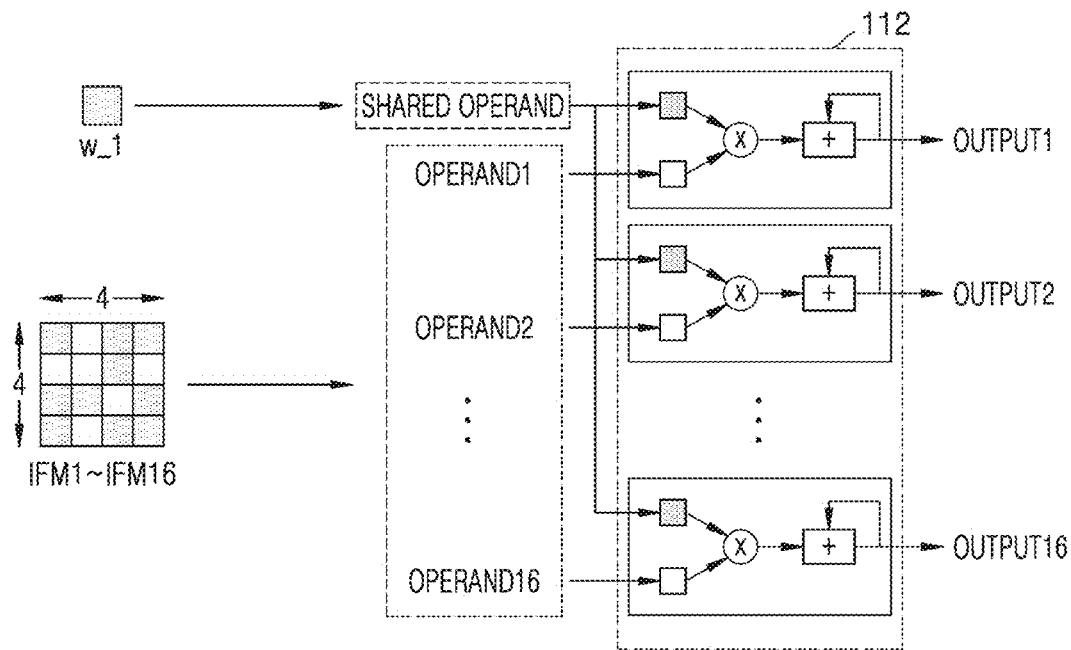
FIGS. 5A and 5B illustrate hardware processing units configured to perform parallelized operations based on a shared operand according to one or more embodiments.
Figure 5B:
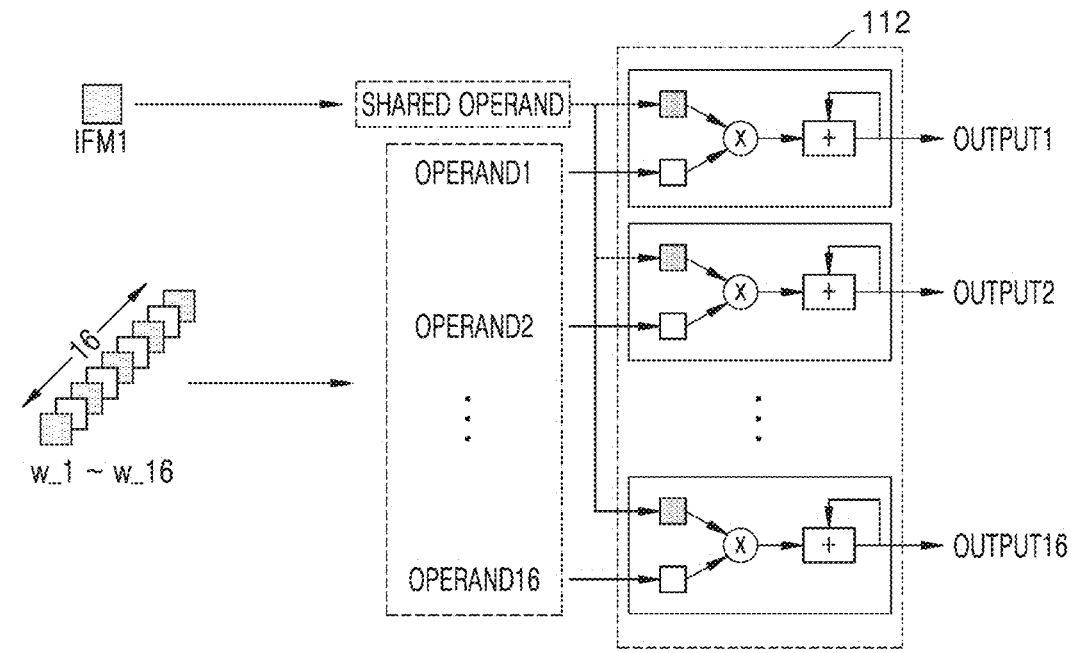

FIGS. 5A and 5B illustrate hardware processing units configured to perform parallelized operations based on a shared operand of the processing units. In an example, the controller and processing units respectively correspond to the controller 114 and processing units 112 of FIG. 3. For convenience of explanation, examples will be discussed below using this example, noting that embodiments are not limited thereto.

In one or more embodiments, as shown in FIG. 5A, the controller 114 may determine a first weight value w_1 of a kernel as the shared operand of the processing units 112. Then, the controller 114 may control the first weight value w_1 to be input to each of 16 processing units 112 and may control 16 pixel values IFM1 through IFM16 of an input feature map to be input to the 16 processing units 112, respectively. For example, the 16 pixel values IFM1 through IFM16 of FIG. 5A may be pixel values corresponding to a first input channel of an input feature map IFM. Each of the 16 processing units 112 may output 16 output values by performing one or more operations with respect to the input operand pair, and the 16 output values may be accumulated in an output feature map OFM.

In one or more embodiments, as shown in FIG. 5B, the controller 114 may determine a first pixel value IFM1 of an input feature map as the shared operand of the processing units 112. Then, the controller 114 may control the first pixel value IFM1 to be input to each of the 16 processing units 112 and may control 16 weight values w_1 through w_16 of a kernel to be input to the 16 processing units 112, respectively. For example, the 16 weight values w_1 through w_16 of the kernel may be respective weight values of 16 output channels of the kernel. Each of the 16 processing units 112 may output 16 output values by performing one or more operations with respect to the input operand pair, and the 16 output values may be accumulated into the output feature map OFM.

In FIGS. 5A and 5B, the number of pixels of one input channel of an input feature map, the number of output channels of a kernel, and the number of processing units 112 are all 16. However, this is merely an example, and embodiments are not limited thereto.

Figure 6:
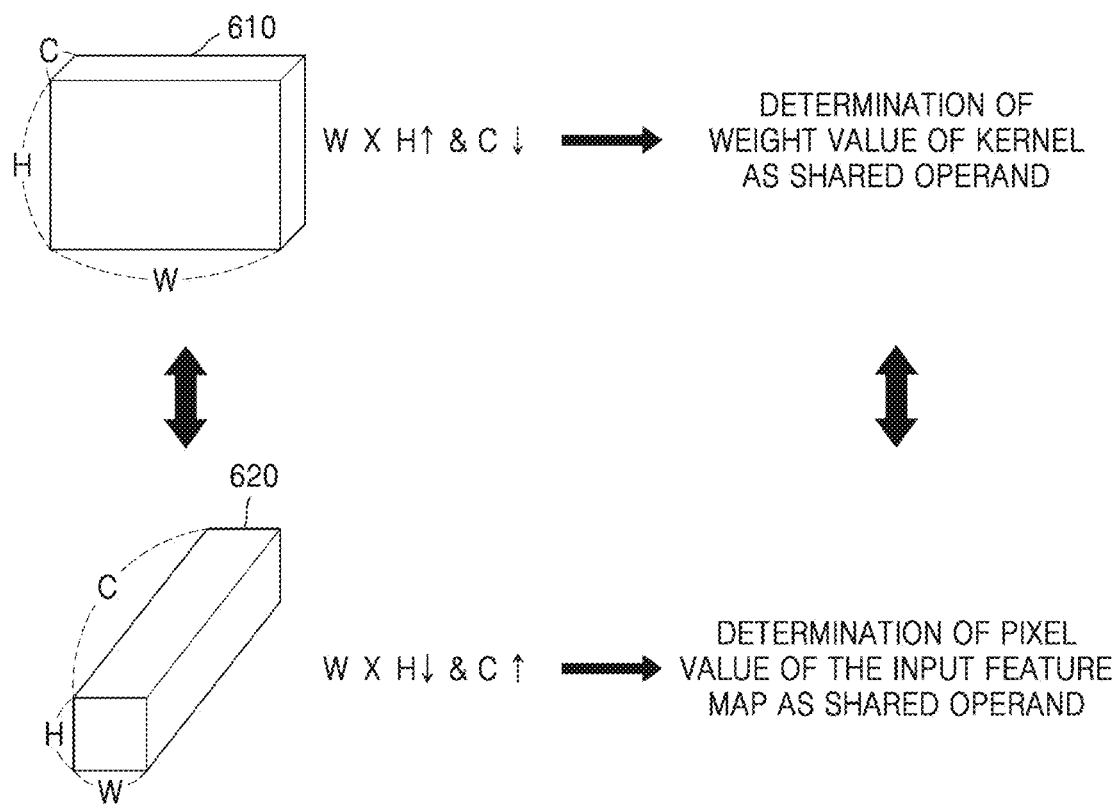
FIG. 6 illustrates a process by which a controller determines a shared operand based on a shape of an input feature map according to one or more embodiments.

FIG. 6 illustrates a process by which a controller determines a shared operand based on a shape of an input feature map. In an example, the controller and processing units respectively correspond to the controller 114 and processing units 112 of FIG. 3, and for convenience of explanation, examples will be discussed below using this example, noting that embodiments are not limited thereto.

In one or more embodiments, the controller 114 may determine the shared operand of the processing units 112 based on the shape of an input feature map. For example, the controller 114 may determine the shared operand considering the number of input channels of the input feature map or the size of a 2D input feature map of each input channel.

According to an example, when it is determined (e.g., in response to determining) that the size of a 2D input feature map of one channel of the input feature map 610 is large and that the number of channels of an input feature map 610 is small, the controller 114 may determine the shared operand of the processing units 112 to be the weight value (or values) of the kernel. For example, when it is determined that an area value (W×H) of the input feature map 610 is large and a depth value C thereof is small (e.g., a shallow depth), the controller 114 may determine the shared operand of the processing units 112 to be the weight value (or values) of the kernel. As the area value (W×H) of the input feature map 610 increases and the depth value C thereof decreases, parallelized operations of the processing units 112 may be more effectively implemented due to execution of a convolution operation by the reuse of the weight value of the kernel, compared to execution of a convolution operation by reuse of a pixel value of the input feature map, and thus the controller 114 may determine the weight value of the kernel as the shared operand. For example, when it is determined that the area value (W×H) of the input feature map 610 is greater than or equal to a preset critical value and/or the depth value C thereof is less than or equal to a preset critical value, the controller 114 may determine the shared operand of the processing units 112 to be the weight value of the kernel. As another example the controller 114 may determine the shared operand of the processing units 112 based on a comparison between the area value (W×H) and the depth value C. For example, when it is determined that the area value (W×H) is sufficiently large compared to the depth value C, the controller 114 may determine the shared operand of the processing units 112 to be the weight value of the kernel. For example, when it is determined that the area value (W×H) is greater than or equal a preset critical value determined as a multiple or portion of the depth value C, the controller 114 may determine the shared operand of the processing units 112 to be the weight value of the kernel.

According to another example, when it is determined (e.g., in response to determining) that the size of a 2D input feature map of one channel of the input feature map 620 is small and that the number of input channels of the input feature map 620 is large, the controller 114 may determine the shared operand of the processing units 112 to be a pixel value of the input feature map. For example, when it is determined that the area value (W×H) of the input feature map 620 is small and the depth value C thereof is large, the controller 114 may determine the shared operand of the processing units 112 to be the pixel value of the input feature map. As the area value (W×H) of the input feature map 610 decreases and the depth value C thereof increases, parallelized operations of the processing units 112 may be more effectively implemented due to execution of a convolution operation by the reuse of the pixel value of the input feature map, compared to execution of a convolution operation by reuse of the weight value of the kernel, and thus, the controller 114 may determine the pixel value of the input feature map as the shared operand. For example, when it is determined that the area value (W×H) of the input feature map 620 is less than or equal to a preset critical value and/or the depth value C thereof is greater than or equal to a preset critical value, the controller 114 may determine the shared operand of the processing units 112 to be the pixel value of the input feature map. As another example the controller 114 may determine the shared operand of the processing units 112 based on a comparison between the area value (W×H) and the depth value C. For example, when it is determined that the depth value C is sufficiently large compared to the area value (W×H), the controller 114 may determine the shared operand of the processing units 112 to be the pixel value of the input feature map. For example, when it is determined that the depth value C is greater than or equal a preset critical value determined as a multiple or portion of the area value (W×H), the controller 114 may determine the shared operand of the processing units 112 to be the pixel value of the input feature map.

As convolution operations with respect to the layers of a neural network are sequentially performed, an output feature map of a layer generated based on an input feature map of the layer may have a smaller area value (W×H) to depth value C ratio than the input feature map of the layer, wherein an input feature map of a succeeding layer may be (or may be based on) the output feature map of the layer, such that an input feature map of an early layer of the neural network may have a similar shape to that of the input feature map 610 of FIG. 6, and an input feature map of a late layer of the neural network may have a similar shape to that of an input feature map 620 of FIG. 6. Accordingly, the controller 114 may determine the shared operand of the processing units 112 to be the weight value of the kernel in the early layer of the neural network and may determine the shared operand of the processing units 112 to be the pixel value of the input feature map in the late layer of the neural network.

Figure 7:
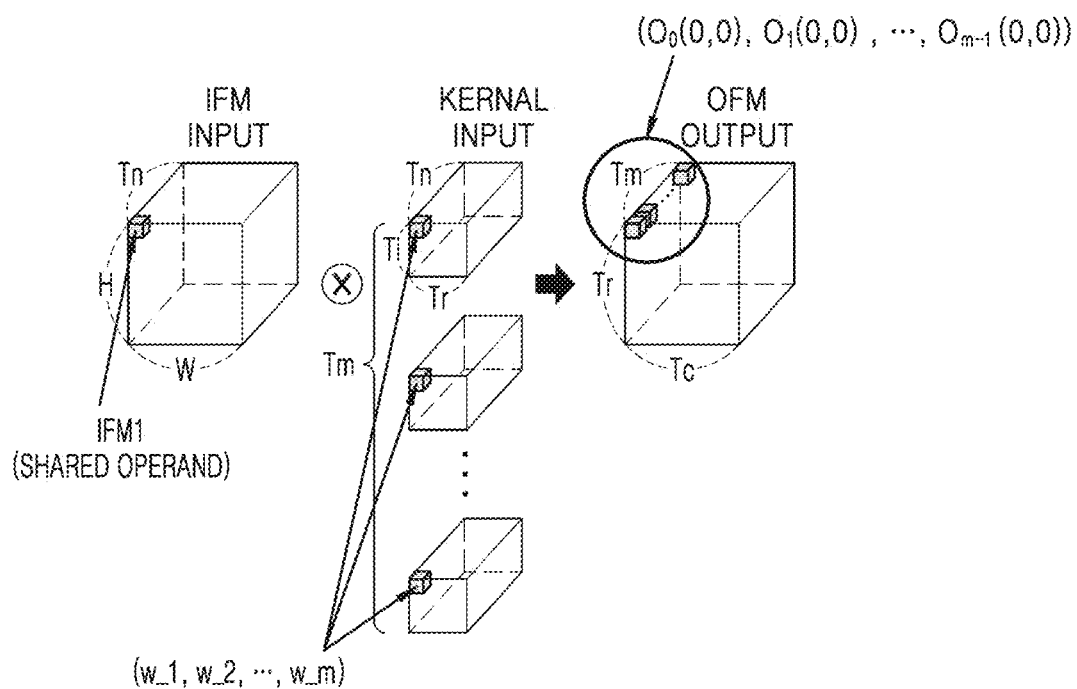
FIG. 7 illustrates hardware processing units configured to perform parallelized operations based on a pixel value of an input feature map being a shared operand of the processing units according to one or more embodiments.
Figure 7:
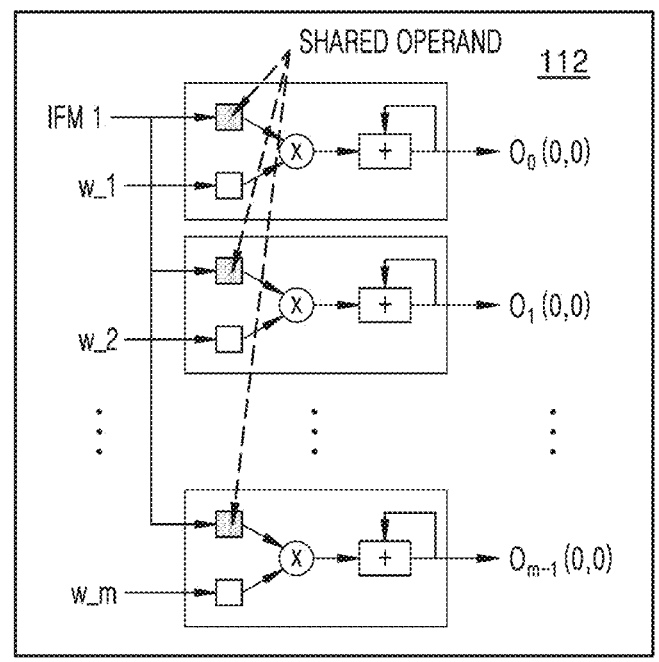

FIG. 7 illustrates hardware processing units configured to perform parallelized operations based on a pixel value of an input feature map IFM being a shared operand of the processing units according to one or more embodiments. In an example, the controller and processing units respectively correspond to the controller 114 and processing units 112 of FIG. 3, and for convenience of explanation, examples will be discussed below using this example, noting that embodiments are not limited thereto.

The controller 114 may determine the shared operand to be the pixel value of the input feature map IFM. Accordingly, the controller 114 may control the pixel value of the input feature map IFM to be commonly input to the processing units 112.

For example, the controller 114 may control a first pixel value IFM1 of the input feature map IFM to be input as the shared operand to each of the processing units 112 and may also control weight values w_1, w_2, through to w_m of a kernel to be input to the processing units 112, respectively. The first pixel value IFM1 may be a pixel value corresponding to location (0,0) of the zero-th input channel of the input feature map IFM, and each of weight values w_1, w_2, through to w_m of kernel may be a weight value corresponding to location (0,0) of the zero-th input channel in each of m output channels of the kernel.

A first processing unit from among the processing units 112 may output an output value $O_0(0,0)$ by performing multiplication and/or addition operations between the first pixel value IFM1 and the weight value w_1, and an m-th processing unit among the processing units 112 may output an output value $O_{m-1}(0,0)$ by performing multiplication and addition operations between the first pixel value IFM1 and the weight value w_m. In other words, the processing units 112 may output output values $O_0(0,0), O_1(0,0)$, through to $O_{m-1}(0,0)$ by performing multiplication and/or addition operations between the first pixel value IFM1 and each of the weight values w_1, w_2, through to w_m, wherein the multiplication and/or addition operations may include a scalar-vector multiplication operation. Also, output values $O_0(0,0), O_1(0,0)$, through to $O_{m-1}(0,0)$ may be accumulated to the zero-th output channel to the m−1 output channel of the output feature map OFM, respectively. For example, each of the output values may be of a respective channel and of a same 2D position of the output feature map.

Similarly, the controller 114 may control another pixel value of the input feature map IFM to be input as the shared operand to each of the processing units 112 and may also control different weight values of the kernel to be input to the processing units 112, respectively. Then, the processing units 112 may output output values by performing multiplication and/or addition operations between the other pixel value of the input feature map IFM and each of the different weight values of the kernel, and the output values may be accumulated to the output feature map OFM.

Figure 8:
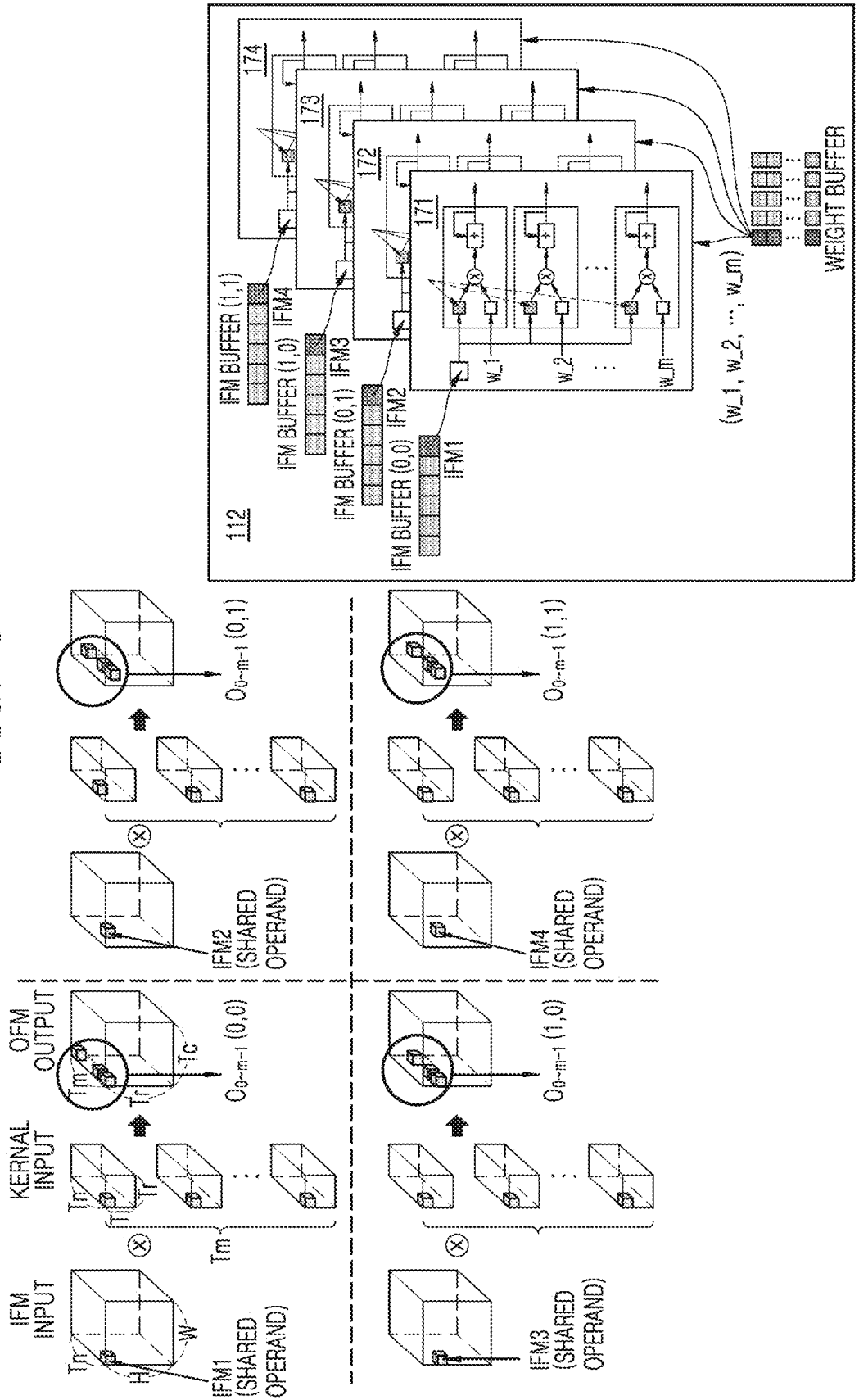
FIG. 8 illustrates hardware processing units configured to perform parallelized operations based on pixel values of an input feature map being a shared operand of the processing units according to one or more embodiments.

FIG. 8 illustrates hardware processing units configured to perform parallelized operations based on pixel values of an input feature map IFM being a shared operand of the processing units according to one or more embodiments. In an example, the controller and processing units respectively correspond to the controller 114 and processing units 112 of FIG. 3, and for convenience of explanation, examples will be discussed below using this example, noting that embodiments are not limited thereto.

The controller 114 may determine the shared operand to be a first pixel value IFM1, a second pixel value IFM2, a third pixel value IFM3, and a fourth pixel value IFM4 of the input feature map IFM. The first pixel value IFM1, the second pixel value IFM2, the third pixel value IFM3, and the fourth pixel value IFM4 may be pixel values respectively corresponding to locations (0,0), (0,1), (1,0), and (1,1) of a zero-th input channel of the input feature map IFM. The controller 114 may control the first pixel value IFM1 to be input as the shared operand to each of first processing units 171 from among the processing units 112 and may also control weight values w_1, w_2, through to w_m of a kernel to be input to the first processing units 171, respectively. Similarly, the controller 114 may control the second pixel value IFM2 to be input as the shared operand to each of second processing units 172 from among the processing units 112 and may also control the weight values w_1, w_2, through to w_m of the kernel to be input to the second processing units 172, respectively. Similarly, the controller 114 may control the third pixel value IFM3 to be input as the shared operand to each of third processing units 173 from among the processing units 112 and may also control the weight values w_1, w_2, through to w_m of the kernel to be input to the third processing units 173, respectively. Similarly, the controller 114 may control the fourth pixel value IFM4 to be input as the shared operand to each of fourth processing units 174 from among the processing units 112 and may also control the weight values w_1, w_2, through to w_m of the kernel to be input to the fourth processing units 174, respectively. For example, the controller 114 may control the first pixel value IFM1 through the fourth pixel value IFM4 to be input to the first processing units 171 through the fourth processing units 174, respectively, from buffers IFM Buffer(0,0) through IFM Buffer(1,1), and may control weight values w_1, w_2, through to w_m to be input to the first processing units 171 through the fourth processing units 174, respectively, from buffer Weight Buffer.

The first processing units 171 may output output values $O_0(0,0)$, $O_1(0,0)$, through to $O_{m-1}(0,0)$ by performing a multiplication operation between the first pixel value IFM1 and each of the weight values w_1, w_2, through to w_m (for example, as described above with reference to FIG. 7). The second processing units 172 may output output values $O_0(0,1)$, $O_2(0,1)$, through to $O_{m-1}(0,1)$ by performing a multiplication operation between the second pixel value IFM2 and each of the weight values w_1, w_2, through to w_m. The third processing units 173 may output output values $O_0(1,0)$, $O_3(1,0)$, through to $O_{m-1}(1,0)$ by performing a multiplication operation between the third pixel value IFM3 and each of the weight values w_1, w_2, through to w_m. The fourth processing units 174 may output output values $O_0(1,1)$, $O_1(1,1)$, through to $O_{m-1}(1,1)$ by performing a multiplication operation between the fourth pixel value IFM4 and each of the weight values w_1, w_2, through to w_m. Accordingly, the output values $O_{0\sim m-1}(0,0)$, $O_{0\sim m-1}(0,1)$, $O_{0\sim m-1}(1,0)$, $O_{0\sim m-1}(1,1)$ output by the first processing units 171 through the fourth processing units 174 may be accumulated to the output feature map OFM.

The respective figures of the input feature map IFM having a size of H×W and including n input channels, the kernel having a size of $T_i$, and including n input channels and m output channels, and the output feature map OFM having a size of $T_r \times T_c$ and including m output channels shown in FIGS. 7 and 8 are merely an example, and embodiments are not limited thereto. The locations of the first through fourth pixel values of the input feature map IFM and the locations of the weight values w_1, w_2, through to w_m of the kernel shown in FIGS. 7 and 8 are also merely an example, and embodiments are not limited thereto.

Figure 9:
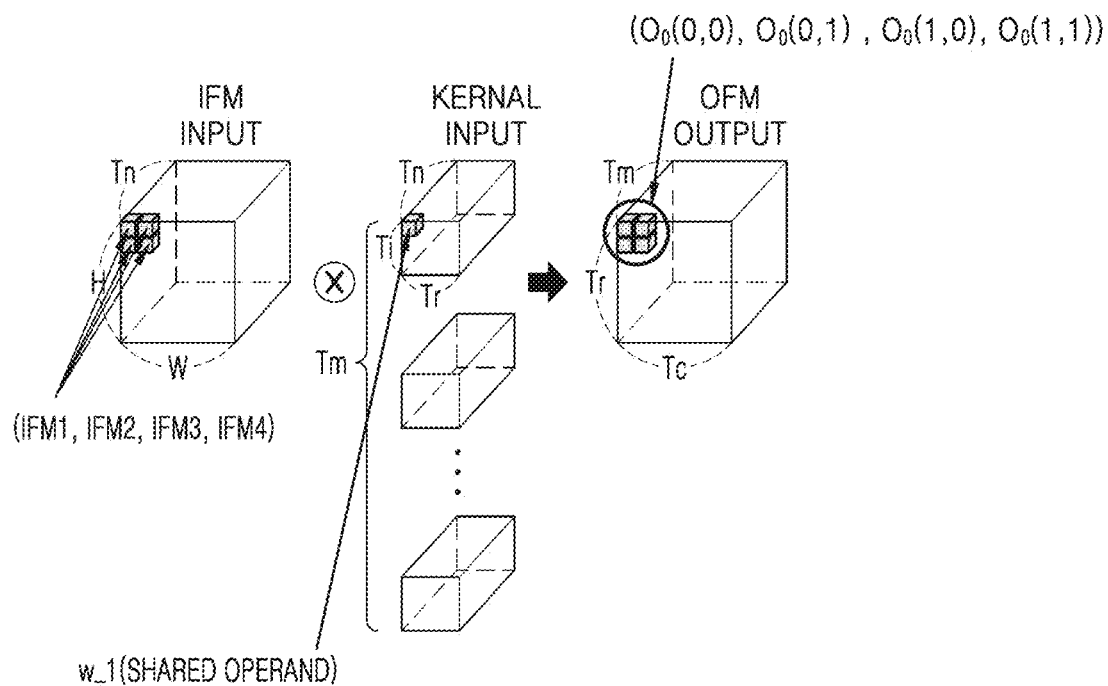
FIG. 9 illustrates hardware processing units configured to perform parallelized operations based on a weight value of a kernel being an shared operand according to one or more embodiments.
Figure 9:
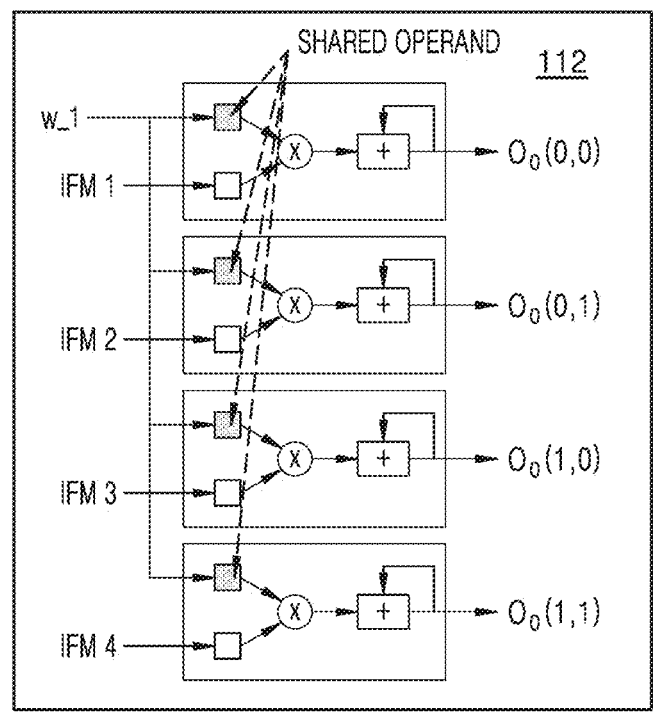

FIG. 9 illustrates hardware processing units configured to perform parallelized operations based on a weight value of a kernel being a shared operand of the processing units according to one or more embodiments. In an example, the processing units correspond to the processing units 112 of FIG. 3, and for convenience of explanation, examples will be discussed below using this example, noting that embodiments are not limited thereto.

In one or more embodiments, the controller 114 may determine the shared operand to be a weight value of a kernel. Accordingly, the controller 114 may control the weight value of the kernel to be commonly input the weight value to the processing units 112.

For example, the controller 114 may control a first weight value w_1 of the kernel to be input as the shared operand to each of the processing units 112 and may also control first, second, third, and fourth pixel values IFM1, IFM2, IFM3, and IFM4 of an input feature map IFM to be input to the processing units 112, respectively. The first weight value w_1 of the kernel may be a weight value corresponding to a location (0,0) of a zero-th output channel and a zero-th input channel of the kernel. The first pixel value IFM1, the second pixel value IFM2, the third pixel value IFM3, and the fourth pixel value IFM4 may be pixel values respectively corresponding to locations (0,0), (0,1), (1,0), and (1,1) of a zero-th input channel of the input feature map IFM.

A first processing unit from among the processing units 112 may output an output value $O_0(0,0)$) by performing multiplication and/or addition operations between the first weight value w_1 and the first pixel value IFM1. Similarly, second, third, and fourth processing units from among the processing units 112 may output an output value $O_0(0,1)$, an output value $O_0(1,0)$, and an output value $O_0(1,1)$, respectively, by performing multiplication and/or addition operations between the first weight value w_1 and the second pixel value IFM2, multiplication and/or addition operations between the first weight value w_1 and the third pixel value IFM3, and multiplication and/or addition operations between the first weight value w_1 and the fourth pixel value IFM4, respectively. In other words, the processing units 112 may output respectively the output values $O_0(0,0)$, $O_0(0,1)$, $O_0(1,0)$, and $O_0(1,1)$ by performing the multiplication and/or addition operations between the first weight value w_1 and each of the first, second, third, and fourth pixel values IFM1, IFM2, IFM3, and IFM4, wherein the multiplication and/or addition operations may include a scalar-vector multiplication operation. The output values $O_0(0,0), O_0(0,1), O_0(1,0)$, and $O_0(1,1)$ may be accumulated to the output feature map OFM. For example, each of the output values may be of a respective 2D position and of a same channel of the output feature map.

Similarly, the controller 114 may control another weight value of the kernel to be input as the shared operand to each of the processing units 112 and may also control different pixel values of the input feature map IFM to be input to the processing units 112, respectively. Then, the processing units 112 may output output values by performing multiplication and/or addition operations between the other weight value of the kernel and each of the different pixel values of the input feature map IFM, and the output values may be accumulated to the output feature map OFM.

Figure 10:
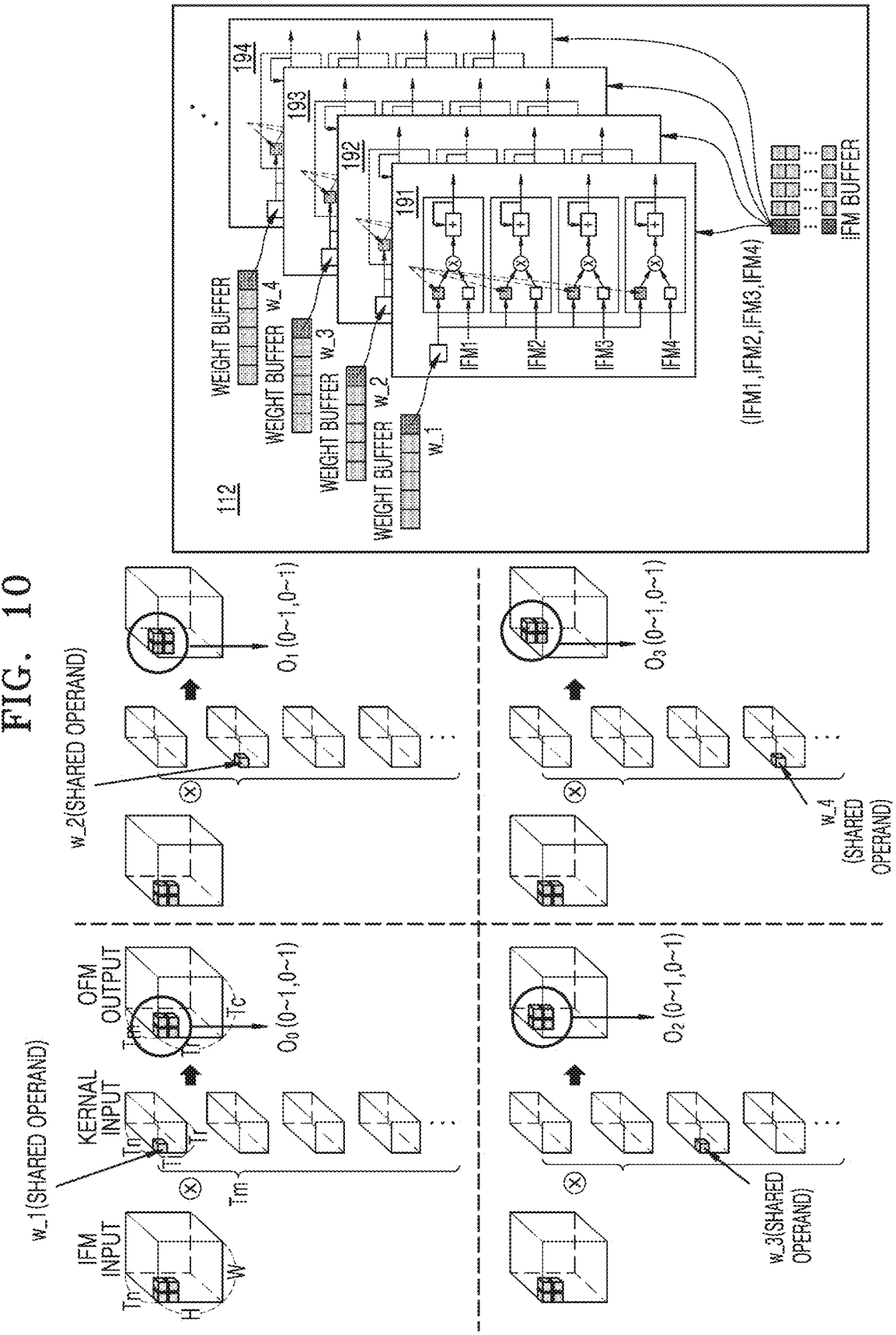
FIG. 10 illustrates hardware processing units configured to perform parallelized operations based on weight values of a kernel being an shared operand according to one or more embodiments.

FIG. 10 illustrates hardware processing units configured to perform parallelized operations based on weight values of a kernel being a shared operand of the processing units according to one or more embodiments. In an example, the controller and processing units respectively correspond to the controller 114 and processing units 112 of FIG. 3, and for convenience of explanation, examples will be discussed below using this example, noting that embodiments are not limited thereto.

The controller 114 may determine the shared operand to be a first weight value w_1, a second weight value w_2, a third weight value w_3, and a fourth weight value w_4 of the kernel. The first weight value w_1, the second weight value w_2, the third weight value w_3, and the fourth weight value w_4 may be weight values corresponding to locations (0,0) of a zero-th input channel respectively corresponding to zero-th, first, second, and third output channels. The controller 114 may control the first weight value w_1 to be input as the shared operand to each of first processing units 191 from among the processing units 112 and may also control first, second, third, and fourth pixel values IFM1, IFM2, IFM3, and IFM4 of an input feature map IFM to be input to the first processing units 191, respectively. Similarly, the controller 114 may control the second weight value w_2 to be input as the shared operand to each of second processing units 192 from among the processing units 112 and may also control the first, second, third, and fourth pixel values IFM1, IFM2, IFM3, and IFM4 of the input feature map IFM to be input to the second processing units 192, respectively. Similarly, the controller 114 may control the third weight value w_3 to be input as the shared operand to each of third processing units 193 from among the processing units 112 and may also control the first, second, third, and fourth pixel values IFM1, IFM2, IFM3, and IFM4 of the input feature map IFM to be input to the third processing units 193, respectively. Similarly, the controller 114 may control the fourth weight value w_4 to be input as the shared operand to each of fourth processing units 194 from among the processing units 112 and may also control the first, second, third, and fourth pixel values IFM1, IFM2, IFM3, and IFM4 of the input feature map IFM to be input to the fourth processing units 194, respectively.

The first processing units 191 may output output values $O_0(0,0)$, $O_0(0,1)$, $O_0(1,0)$, and $O_0(1,1)$ by performing a multiplication operation between the first weight value w_1 and each of the first, second, third, and fourth pixel values IFM1, IFM2, IFM3, and IFM4 (for example, as described above with reference to FIG. 9). The second processing units 192 may output output values $O_1(0,0)$, $O_1(0,1)$, $O_1(1,0)$, and $O_1(1,1)$ by performing a multiplication operation between the second weight value w_2 and each of the first, second, third, and fourth pixel values IFM1, IFM2, IFM3, and IFM4. The third processing units 193 may output output values $O_2(0,0)$, $O_2(0,1)$, $O_2(1,0)$, and $O_2(1,1)$ by performing a multiplication operation between the third weight value w_3 and each of the first, second, third, and fourth pixel values IFM1, IFM2, IFM3, and IFM4. The fourth processing units 194 may output output values $O_3(0,0)$, $O_3(0,1)$, $O_3(1,0)$, and $O_3(1,1)$ by performing a multiplication operation between the fourth weight value w_4 and each of the first, second, third, and fourth pixel values IFM1, IFM2, IFM3, and IFM4. Accordingly, the output values $O_0(0-1,0-1)$, $O_1(0-1,0-1)$, $O_2(0-1,0-1)$, and $O_3(0-1,0-1)$ output by the first, second, third, and fourth processing units 191, 192, 193, and 194 may be accumulated to the output feature map OFM.

The respective figures of the input feature map IFM having a size of H×W and including n input channels, the kernel having a size of $Ti_r$ and including n input channels and m output channels, and the output feature map OFM having a size of $T_r \times T_c$ and including m output channels shown in FIGS. 9 and 10 are merely an example, and embodiments are not limited thereto. The locations of the first through fourth weight values w_1 through w_4 and the location of the first, second, third, or fourth pixel value IFM1, IFM2, IFM3, or IFM4 shown in FIGS. 9 and 10 are merely an example, and embodiments are not limited thereto.

Referring back to FIG. 3, the processing units 112 may perform parallelized operations, based on the shared operand determined by the controller 114. At this time, when the shared operand is zero, the processing units 112 may skip the parallelized operations. In other words, the processing units 112 may implement zero skipping based on the shared operand.

For example, the controller 114 may determine the pixel value of the input feature map as the shared operand, e.g., as described above with reference to FIGS. 5B, 7, and/or 8. According to an example, when a first pixel value of the input feature map is zero, the processing units 112 may skip parallelized operations between the first pixel value of the input feature map and first weight values of the kernel. Accordingly, the processing units 112 may perform parallelized operations between a second pixel value of the input feature map being non-zero, instead of the first pixel value being zero, and second weight values of the kernel. According to another example, when all of the first weight values of the kernel are zero, the processing units 112 may skip the parallelized operations between the first pixel value of the input feature map and the first weight values of the kernel and may perform the parallelized operations between the second pixel value of the input feature map and the second weight values of the kernel.

As another example, the controller 114 may determine the weight value of the kernel as the shared operand, e.g., as described above with reference to FIGS. 5A, 9, and/or 10. According to an example, when a first weight value of the kernel is zero, the processing units 112 may skip parallelized operations between the first weight value of the kernel and first pixel values of the input feature map. Accordingly, the processing units 112 may perform parallelized operations between a second weight value of the kernel being non-zero, instead of the first weight value being zero, and second pixel values of the input feature map. According to another example, when all of the first pixel values of the input feature map are zero, the processing units 112 may skip the parallelized operations between the first weight value of the kernel and the first pixel values and may perform the parallelized operations between the second weight value of the kernel and the second pixel values.

Because the neural network apparatus 100 may implement zero skipping through whether the shared operand of the processing units 112 is zero or whether all of the remaining operands of the processing units 112 are zero as described above, a simplified hardware structure for zero skipping may be realized.

Figure 11:
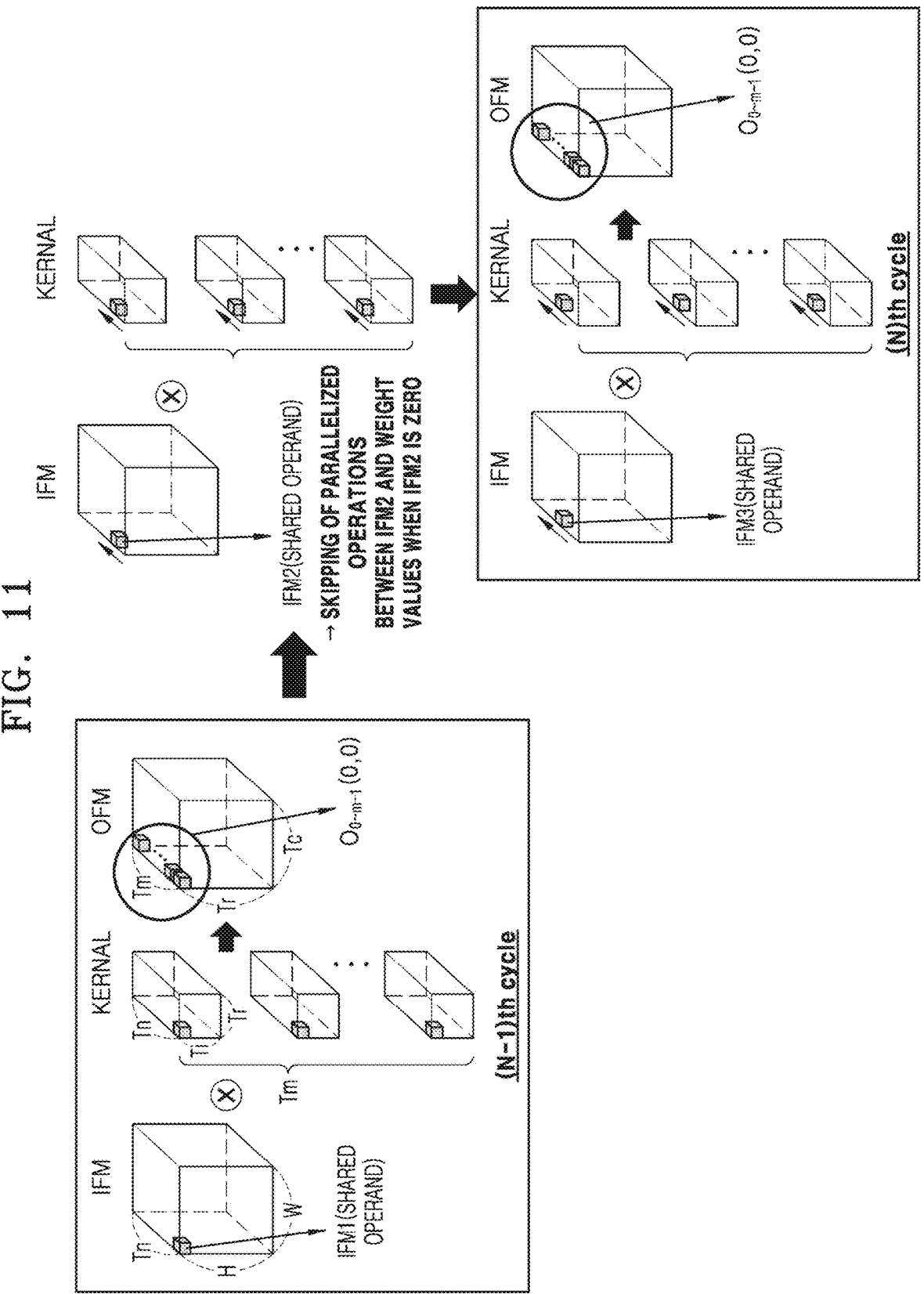
FIG. 11 illustrates a process by which hardware processing units perform zero skipping based on a shared operand being zero according to one or more embodiments.

FIG. 11 illustrates a process by which hardware processing units perform zero skipping based on a shared operand being zero according to one or more embodiments. In an example, the processing units correspond to the processing units 112 of FIG. 3, and for convenience of explanation, examples will be discussed below using this example, noting that embodiments are not limited thereto.

In one or more embodiments, the processing units 112 may output output values by performing parallelized operations, based on the first pixel value IFM1 of the input feature map IFM being the shared operand, in an (N−1)th cycle. For example, the processing units 112 may output output values by performing parallelized operations between the first pixel value IFM1 located at (0,0) of the zero-th input channel of the input feature map IFM and weight values located at (0,0) of the zero-th input channel respectively corresponding to zero-th through (m−1)th output channels of the kernel. The output values may be accumulated to $O_{0 \sim m-1}(0,0)$ being (0,0) locations of zero-th through (m−1)th output channels of the output feature map OFM.

Then, the processing units 112 may perform the parallelized operations, based on the second pixel value IFM2 of the input feature map IFM, in an N-th cycle. However, when it is determined that the second pixel value IFM2 is zero, the processing units 112 may skip parallelized operations between the second pixel value IFM2 and the weight values. For example, the processing units 112 may skip parallelized operations between the second pixel value IFM2 located at (0,0) of the first input channel of the input feature map IFM and weight values located at (0,0) of the first input channel respectively corresponding to the zero-th through (m−1)th output channels of the kernel.

Then, the processing units 112 may output output values by performing parallelized operations, based on the third pixel value IFM3 of the input feature map IFM, in the N-th cycle. In detail, the processing units 112 may output output values by performing parallelized operations between the third pixel value IFM3 located at (0,0) of the second input channel of the input feature map IFM and weight values located at (0,0) of the second input channel respectively corresponding to the zero-th through (m−1)th output channels of the kernel. The output values may be accumulated to $O_{0 \sim m-1}(0,0)$ being (0,0) locations of the zero-th through (m−1)th output channels of the output feature map OFM.

Consequently, when the second pixel value IFM2 is zero, the processing units 112 may perform parallelized operations, based on the third pixel value IFM3 after the first pixel value IFM1, and locations on the output feature map OFM to which the output values based on the first pixel value IFM1 are accumulated may be the same as those on the output feature map OFM to which the output values based on the third pixel value IFM3 are accumulated. Accordingly, the neural network apparatus 100 may reduce an operation count of the convolution operation and an operation time period thereof via zero skipping and at the same time may maintain the locations to which output values are accumulated to be the same, and thus, efficiently process the convolution operation of a neural network.

Figure 12:
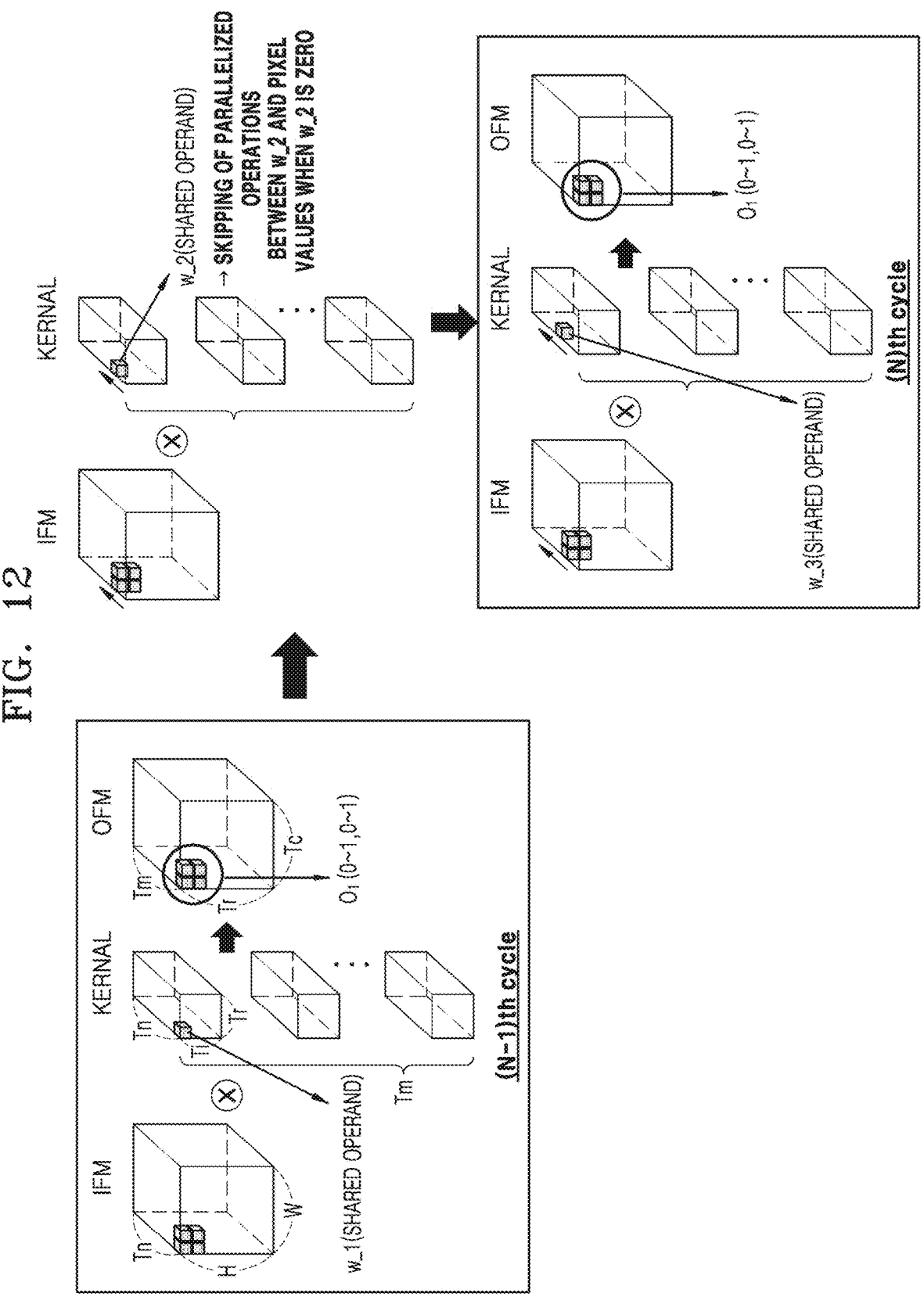
FIG. 12 illustrates a process by which hardware processing units perform zero skipping based on a shared operand being zero according to one or more embodiments.

FIG. 12 illustrates a process by which hardware processing units perform zero skipping based on a shared operand being zero according to one or more embodiments. In an example, the processing units correspond to the processing units 112 of FIG. 3, and for convenience of explanation, examples will be discussed below using this example, noting that embodiments are not limited thereto.

In one or more embodiments, the processing units 112 may output output values by performing parallelized operations, based on the first weight value w_1 of the kernel being the shared operand, in an (N−1)th cycle. For example, the processing units 112 may output output values by performing parallelized operations between the first weight value w_1 located at (0,0) of the zero-th output channel and the zero-th input channel of the kernel and pixel values located at (0~1,0~1) of the zero-th input channel of the input feature map IFM. The output values may be accumulated to $O_0(0\sim1, 0\sim1)$ being (0~1,0~1) of the zero-th output channel of the output feature map OFM.

Then, the processing units 112 may perform parallelized operations, based on the second weight value w_2 of the kernel, in an N-th cycle. However, when it is determined that the second pixel value w_2 is zero, the processing units 112 may skip parallelized operations between the second weight value w_2 and the pixel values. For example, the processing units 112 may skip parallelized operations between the second weight value w_2 located at (0,0) of the zero-th output channel and the first input channel of the kernel and pixel values located at (0~1,0~1) of the first input channel of the input feature map IFM.

Then, the processing units 112 may output output values by performing parallelized operations, based on the third weight value w_3 of the kernel, in the N-th cycle. In detail, the processing units 112 may output output values by performing parallelized operations between the third weight value w_3 located at (0,0) of the zero-th output channel and the second input channel of the kernel and pixel values located at (0~1,0~1) of the second input channel of the input feature map IFM. The output values may be accumulated to $O_0(0\sim1, 0\sim1)$ being (0~1,0~1) of the zero-th output channel of the output feature map OFM.

Consequently, when the second weight value w_2 is zero, the processing units 112 may perform parallelized operations, based on the third weight value w_3 after the first weight value w_1, and locations on the output feature map OFM to which the output values based on the first weight value w_1 are accumulated may be the same as those on the output feature map OFM to which the output values based on the third weight value w_3 are accumulated. Accordingly, the neural network apparatus 100 may reduce an operation count of the convolution operation and an operation time period thereof via zero skipping and at the same time may maintain the locations to which output values are accumulated to be the same, and thus, efficiently process the convolution operation of a neural network.

Figure 13:
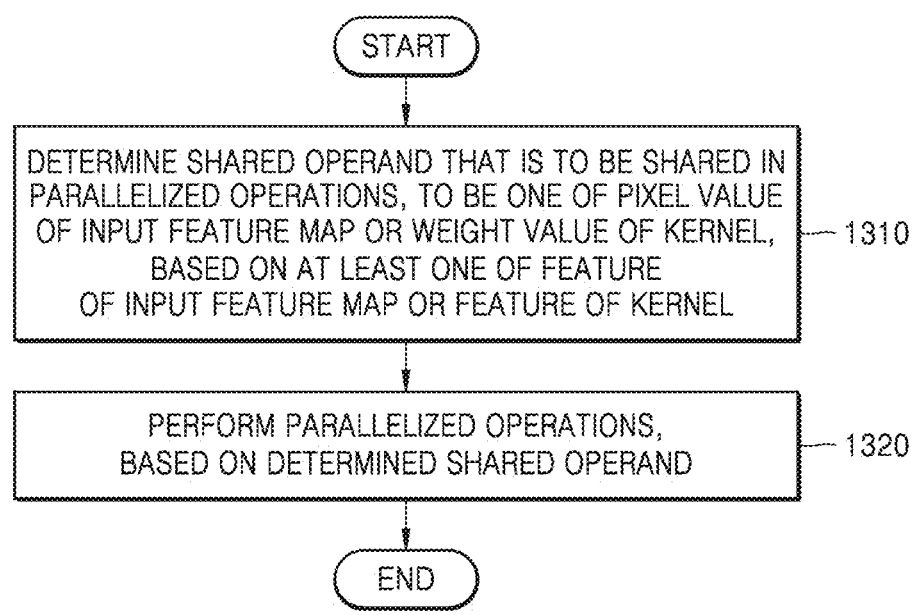
FIG. 13 illustrates an operation method of a neural network apparatus according to one or more embodiments.

FIG. 13 illustrates an operation method of a neural network apparatus according to one or more embodiments.

The operation method of FIG. 13 may be performed by the components of the neural network apparatus 100 of FIGS. 1 through 12, and a redundant description thereof will be omitted here.

In operation 1310, the neural network apparatus 100 may determine a shared operand that is to be shared in parallelized operations, to be one of the pixel value of an input feature map and the weight value of a kernel, based on at least one of the feature of the input feature map or the feature of the kernel. According to an example, during a convolution operation between a first input feature map and a first kernel, the neural network apparatus 100 may determine the shared operand to be the weight value of the first kernel. According to another example, during a convolution operation between a second input feature map and a second kernel, the neural network apparatus 100 may determine the shared operand to be the pixel value of the second input feature map.

The neural network apparatus 100 may determine the shared operand to be one of the pixel value of the input feature map or the weight value of the kernel, based on at least one of the feature of the input feature map or the feature of the kernel. For example, the neural network apparatus 100 may determine the shared operand to be one of the pixel value of the input feature map or the weight value of the kernel, based on at least one of the percentage of pixels having a zero value within the input feature map, the percentage of weights having a zero value within the kernel, or the shape of the input feature map.

The neural network apparatus 100 may determine the shared operand to be one of the pixel value of the input feature map or the weight value of the kernel, for each layer of a neural network. For example, during a convolution operation between an input feature map of a first layer and a kernel of the first layer, the neural network apparatus 100 may determine a shared operand of the first layer to be the weight value of the kernel of the first layer. During a convolution operation between an input feature map of a second layer and a kernel of the second layer, the neural network apparatus 100 may determine a shared operand of the second layer to be the pixel value of the input feature map of the second layer.

In operation 1320, the neural network apparatus 100 may perform parallelized operations, based on the shared operand. For example, when the pixel value of the first input feature map is determined as the shared operand, the neural network apparatus 100 may perform parallelized operations between the pixel value of the first input feature map and the weight values of the first kernel. As another example, when the weight value of the first kernel is determined as the shared operand, the neural network apparatus 100 may perform parallelized operations between the weight value of the first kernel and the pixel values of the first input feature map. The neural network apparatus 100 may accumulate output values obtained via the parallelized operations to an output feature map.

When the determined shared operand is zero, the neural network apparatus 100 may skip the parallelized operations. According to an example, when a first pixel value is zero, the neural network apparatus 100 may skip parallelized operations between the first pixel value and first weight values of the kernel. Accordingly, the neural network apparatus 100 may perform parallelized operations between a second pixel value being non-zero, instead of the first pixel value being zero, and second weight values of the kernel. According to another example, when a first weight value is zero, the neural network apparatus 100 may skip parallelized operations between the first weight value and first pixel values of the input feature map. Accordingly, the neural network apparatus 100 may perform parallelized operations between a second weight value being non-zero, instead of the first weight value being zero, and second pixel values of the input feature map.

According to one or more embodiments, because an shared operand to be shared in parallelized operations for a convolution operation may be determined to be one of the pixel value of an input feature map or the weight value of a kernel, the parallelism of the convolution operation may be more effectively implemented.

According to one or more embodiments, when a 3D convolution operation between an input feature map having a 3D size and a kernel having a 4D size is performed, although the dimensions of the input feature map and the kernel are different from each other, one of the pixel value of the input feature map or the weight value of the kernel may be determined as the shared operand, and thus a hardware structure capable of performing parallelized operations may be realized.

According to one or more embodiments, because zero skipping is implemented through whether the shared operand of processing units is zero or whether all of the remaining operands of the processing units are zero, a simplified hardware structure for zero skipping may be realized.

The neural network apparatuses, neural network apparatus 100, controllers 114, processing units 112, memories 120, buffers, IFM buffers, weight buffers, and other apparatuses, units, modules, devices, and other components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network apparatus, comprising:
one or more processors configured to execute instructions; and
a memory storing the instructions, wherein execution of the instructions configures the processors to:
obtain an input feature map and a kernel;
determine a shared operand to be shared in parallelized convolution operations as being either one of a pixel value among pixel values of an input feature map and a weight value among weight values of a kernel based on a shape of the input feature map and dimensions of the kernel; and
perform the parallelized convolution operations using the shared operand, wherein the shared operand is determined as:
being the pixel value of the input feature map in response to a two-dimensional area size of the input feature map being less than or equal to a first threshold value; and
being the weight value of the kernel in response to a two-dimensional area size of the input feature map greater than the first threshold value,
wherein the first threshold value is a reference value used to determine whether the shared operand is the pixel value of the input feature map or the weight value of the kernel.

2. The apparatus of claim 1, wherein the shared operand, the pixel value of the input feature map, and the weight value of the kernel are of a first layer of a neural network, and
wherein the one or more processors are further configured to:
determine, for a second layer of the neural network, a second shared operand of the second layer to be either one of a pixel value of among pixel values of an input feature map of the second layer and a weight value among weight values of a kernel of the second layer, based on a second shape of the input feature map of the second layer and second dimensions of the kernel of the second layer.

3. The apparatus of claim 1, wherein the one or more processors are further configured to determine the shared operand further based on either one or both of a percentage of pixels having a zero value within the input feature map and a percentage of weights having a zero value within the kernel.

4. The apparatus of claim 3, wherein the one or more processors are further configured to determine the shared operand to be the pixel value of the input feature map in response to the percentage of the pixels having a zero value is greater than a third threshold value, and the shared operand to be the weight value of the kernel in response to the percentage of the weights having a zero value is greater than a fourth threshold value.

5. The apparatus of claim 1, wherein the one or more processors are configured to:
determine the shared operand to be the weight value of the kernel in response to determining that a number of channels of the input feature map is smaller than a second threshold value and the two-dimensional area size of the input feature map is greater than the first threshold value; and
determine the shared operand to be the pixel value of the input feature map in response to determining that the number of the channels of the input feature map is greater than or equal to the second threshold value and the two-dimensional area size of the input feature map is less than or equal to the first threshold value.

6. A processor-implemented neural network method, the method comprising:
   obtaining an input feature map and a kernel;
   determining a shared operand to be shared in parallelized convolution operations as being either one of a pixel value among pixel values of an input feature map and a weight value among weight values of a kernel based on a shape of the input feature map and dimensions of the kernel; and
   performing the parallelized convolution operations using the shared operand,
   wherein the shared operand is determined as:
      being the pixel value of the input feature map in response to a two-dimensional area size of the input feature map being less than or equal to a first threshold value; and
      being the weight value of the kernel in response to a two-dimensional area size of the input feature map greater than the first threshold value,
   wherein the first threshold value is a reference value used to determine whether the shared operand is the pixel value of the input feature map or the weight value of the kernel.

7. The method of claim 6, wherein the shared operand, the pixel value of the input feature map, and the weight value of the kernel are of a first layer of a neural network, and
   wherein the method further comprises:
      determining, for a second layer of the neural network, a second shared operand of the second layer to be either one of a pixel value of among pixel values of an input feature map of the second layer and a weight value among weight values of a kernel of the second layer, based on a second shape of the input feature map of the second layer and second dimensions of the kernel of the second layer.

8. The method of claim 6, wherein the determining the shared operand comprises determining the shared operand further based on either one or both of a percentage of pixels having a zero value within the input feature map and a percentage of weights having a zero value within the kernel.

9. The method of claim 8, wherein the determining the shared operand comprises determining the shared operand to be the pixel value of the input feature map in response to the percentage of the pixels having a zero value is greater than a third threshold value, and the shared operand to be the weight value of the kernel in response to the percentage of the weights having a zero value is greater than a fourth threshold value.

10. The method of claim 6, wherein the determining the shared operand comprises:
    determining the shared operand to be the weight value of the kernel in response to determining that a number of channels of the input feature map is smaller than a second threshold value and the two-dimensional area size of the input feature map is greater than the first threshold value; and
    determining the shared operand to be the pixel value of the input feature map in response to determining that the number of the channels of the input feature map is greater than or equal to the second threshold value and the two-dimensional area size of the input feature map is less than or equal to the first threshold value.

11. A non-transitory computer-readable storage medium storing instructions that, when executed by one or more processors, cause the one or more processors to perform the method of claim 6.

* * * * *